US012806590B2

(12) United States Patent
Mohan et al.

(10) Patent No.: US 12,806,590 B2
(45) Date of Patent: Nov. 24, 2026

(54) SYSTEM AND METHOD FOR A MULTI-CHAMBER BIOMASS REACTOR

(71) Applicant: Takachar Lmited, Richmond, CA (US)

(72) Inventors: Vidyut Mohan, New Delhi (IN); Kevin Kung, Richmond, CA (US)

(73) Assignee: Takachar Limited, Richmond, CA (US)

( * ) Notice: Subject to any disclaimer, the term of this patent is extended or adjusted under 35 U.S.C. 154(b) by 862 days.

(21) Appl. No.: 17/927,021

(22) PCT Filed: May 27, 2021

(86) PCT No.: PCT/US2021/034519
§ 371 (c)(1),
(2) Date: Nov. 22, 2022

(87) PCT Pub. No.: WO2021/243022
PCT Pub. Date: Dec. 2, 2021

(65) Prior Publication Data

US 2023/0201784 A1 Jun. 29, 2023

Related U.S. Application Data

(60) Provisional application No. 63/076,571, filed on Sep. 10, 2020, provisional application No. 63/030,861, filed on May 27, 2020.

(51) Int. Cl.
*B01J 8/00* (2006.01)
*B09B 3/45* (2022.01)
(Continued)

(52) U.S. Cl.
CPC ................. *B01J 8/008* (2013.01); *B09B 3/45* (2022.01); *C10L 5/40* (2013.01); *C10L 9/08* (2013.01);
(Continued)

(58) Field of Classification Search
CPC .... C10L 5/40; C10L 9/08; B01J 8/008; B09B 3/45
See application file for complete search history.

(56) References Cited

U.S. PATENT DOCUMENTS 6,015,496 A 1/2000 Khudenko
6,767,375 B1 7/2004 Pearson
(Continued)

FOREIGN PATENT DOCUMENTS

CN 101805690 B 10/2012
CN 103608438 B * 8/2016 ............. F26B 17/20
(Continued)

OTHER PUBLICATIONS

CN-103608438-B Machine translation (Year: 2016).*
RU-2399410-C2 machine translation (Year: 2010).*
CN-108225024-A machine translation (Year: 2018).*

*Primary Examiner* — Claire X Wang
*Assistant Examiner* — Alyssa Lee Kuykendall
(74) *Attorney, Agent, or Firm* — Alpine Patents LLC; Brian Van Osdol

(57) ABSTRACT

A system and method for a multi-chamber biomass reactor that includes: a reaction chamber, comprising the primary chamber for biomass processing; an outlet chamber, adjacent and connected to the reaction chamber; a biomass inlet, comprising a region for the input of biomass into the biomass reactor; a conveyor system, comprising components that actuate the biomass, and other components, through the biomass reactor from the biomass inlet through the reaction chamber, and through the outlet chamber; and a gas exchange system, that controls gas flow within the biomass reactor, comprising: at least one air vent; and an exhaust. The system functions to process biomass, whereby the system converts input biomass into energy rich products, such as coal, char, bio-fuel, fertilizer, briquettes, electricity.
(Continued)

The system and method may further include a variable incline module, comprising actuating components that can alter the incline and/or height of the biomass reactor and/or biomass reactor components.

20 Claims, 21 Drawing Sheets

(51) Int. Cl.
*C10L 5/40* (2006.01)
*C10L 9/08* (2006.01)

(52) U.S. Cl.
CPC ....... *C10L 2290/02* (2013.01); *C10L 2290/50* (2013.01); *C10L 2290/58* (2013.01); *C10L 2290/60* (2013.01)

(56) References Cited

U.S. PATENT DOCUMENTS

| | | | |
|---|---|---|---|
| 7,097,762 B1 | 8/2006 | Ruocco et al. | |
| 9,022,311 B2 * | 5/2015 | Thomas | B64D 27/402 244/1 N |
| 2003/0223909 A1 | 12/2003 | Oberbeck et al. | |
| 2011/0258837 A1 | 10/2011 | Scannon et al. | |
| 2011/0278150 A1 | 11/2011 | Mulqueen et al. | |
| 2012/0107921 A1 | 5/2012 | Willson et al. | |
| 2013/0247448 A1 | 9/2013 | Ampulski et al. | |
| 2014/0157777 A1 | 6/2014 | Kramer et al. | |
| 2014/0332724 A1 | 11/2014 | Tsangaris et al. | |
| 2016/0053181 A1 | 2/2016 | Ericsson et al. | |
| 2016/0185633 A1 | 6/2016 | Pullammanappallil et al. | |
| 2017/0312731 A1 | 11/2017 | Vu | |
| 2019/0010069 A1 | 1/2019 | Skardon | |
| 2020/0017788 A1 | 1/2020 | Endo et al. | |
| 2023/0032416 A1 | 2/2023 | Kung et al. | |

FOREIGN PATENT DOCUMENTS

| | | | | |
|---|---|---|---|---|
| CN | 205590629 U | | 9/2016 | |
| CN | 108225024 A | * | 6/2018 | F27B 17/02 |
| EP | 2199375 A2 | | 6/2010 | |
| EP | 3527647 A1 | * | 8/2019 | B29C 48/92 |
| RU | 2399410 C2 | * | 9/2010 | C02F 11/08 |
| WO | WO-2020121019 A1 | * | 6/2020 | F23G 5/02 |

* cited by examiner

Detailed view of D from FIGURE 7
(Lengths in mm)

Detailed view of E from FIGURE 7
(Lengths in mm)

SYSTEM AND METHOD FOR A MULTI-CHAMBER BIOMASS REACTOR

CROSS-REFERENCE TO RELATED APPLICATIONS

This Application is a U.S. National Stage under 35 USC 371 of PCT Application No. PCT/US21/34519, filed on 27 May 2021, which claims the benefit of U.S. Provisional Application No. 63/030,861, filed on 27 May 2020, and U.S. Provisional Application No. 63/076,571, filed on 10 Sep. 2020, all of which are incorporated in their entireties by this reference.

TECHNICAL FIELD

This invention relates generally to the field of biomass processing and more specifically to a new and useful system and method for a multi-chamber biomass reactor.

BACKGROUND

Moving bed biomass thermochemical reactors often have problems directing the gas flow. When operated under positive pressure, the volatile off-gas and exhaust gas from the thermochemical reaction may exit the reactor from more than one passageway, which may not be desirable. Often, it is desirable to direct most of the volatile off-gas and exhaust gas to flow in one channel directed to the outlet, such that the gas can be processed/oxidized/vented appropriately in order to extract heat from it and at the same time to satisfy any pollution standards. As an example, in a moving bed reactor that involves one or more post-reaction solid outlets, sometimes it is not desirable to have the volatile off-gas and exhaust gas travel in the same direction as the solid materials. When operated under negative pressure (natural convection), it may be desirable yet challenging for the incoming air to come in through a dedicated air injection port, and not through any other passageways, such as the solid outlet.

Another undesirable scenario may be observed in a biomass moving bed reactor (e.g., similar to the one described in WO 2018/213474A1, which is incorporated in its entirety here with this application by reference) is that the rising hot air in the main reaction chamber at the bottom of the moving bed may create a negative pressure (chimney effect) that draws air into the reactor from the char exit through the length of the char-cooling outlet. This air flows countercurrent to the outgoing torrefied/charred biomass that is supposed to be cooled may create an oxidative environment that continues the oxidation/burning of the torrefied/charred biomass and preventing proper cooling. The result is the loss of carbon from torrefied biomass and decreased output mass and solid energy yields.

In some cases, involving dense biomass (such as pine shavings and rice husks), the biomass within the reactor bed provides sufficient fluid resistance (“plug”) to prevent the free passage of air through the reactor and the formation of the chimney effect (or the reverse). In this case, while there is air inside the char-cooling segment, it cannot readily penetrate the dense biomass bed into the moving bed region. Therefore, there is no forced flow (chimney effect). In contrast, in the case of loose biomass (e.g., coconut shells), there is sufficient void space in the moving bed and in the char-cooling segment such that air can enter freely into the moving bed, creating a strong chimney effect. In fact, in some cases, the air flow from the char outlet is so strong relative to the forced air flow inlets, such that the latter is useless in metering the air-to-biomass ratio inside the reaction zone. In such cases, control over the reaction zone is lost, and the air-to-biomass ratio is simply set by the strength of the chimney effect formed by the moving bed.

To account for these problems there, there is a need for a bioreactor system and method that is capable of controlling air currents, controls off-gas and exhaust, makes efficient use of exhaust and off-gas, and can handle both loose and dense biomass without creating a chimney effect. This invention provides such a new and useful system and method.

DESCRIPTION OF THE EMBODIMENTS

The following description of the embodiments of the invention is not intended to limit the invention to these embodiments but rather to enable a person skilled in the art to make and use this invention.

1. Overview

Figure 1:
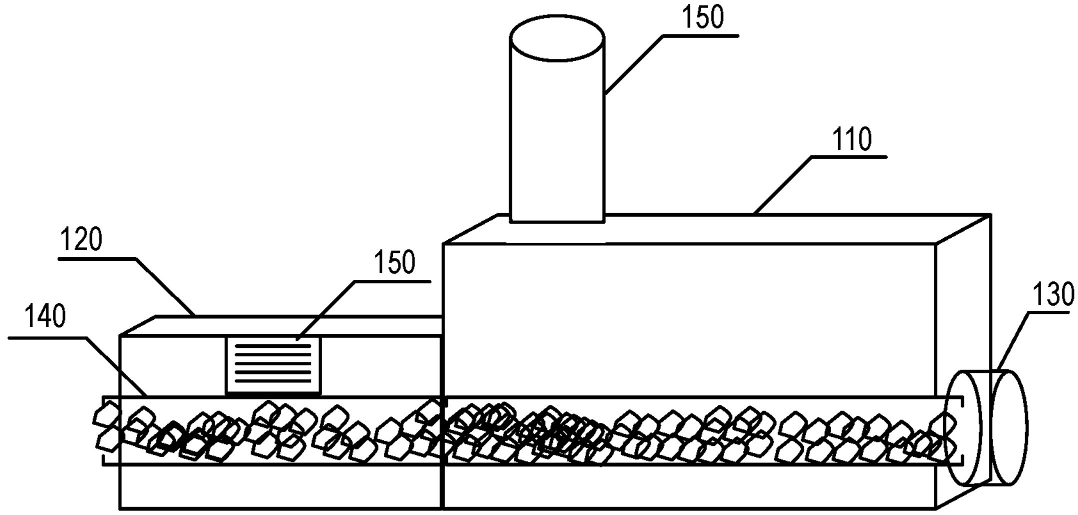
FIG. 1 is a schematic of an example system.

As shown in FIG. 1, a system and method for a multi-chamber biomass reactor can include: a reaction chamber, comprising the primary chamber for biomass processing; an outlet chamber, adjacent and connected to the reaction chamber, primarily for biomass end-product cooling; a biomass inlet, comprising a region for the input of biomass into the biomass reactor; a conveyor system, comprising components that actuate the biomass through the biomass reactor from the biomass inlet through the reaction chamber, and through the outlet chamber; a gas exchange system, that controls gas flow within the biomass reactor, comprising: air vents and an exhaust; and a variable incline module that lowers and raises the chamber components. The system and method function as a biomass reactor that leverages the conveyor system to modify the biomass density and a gas exchange system to control air/gas current through the reactor. This may be particularly useful in portable biomass reactors that may need to be used in a variety of environments and conditions and may benefit from dynamically calibrating configuration based on the use of a portable biomass reactor.

The system and method may have particular applicability for the field of portable bioreactors (i.e., a biomass reactor). That is, the system and method provide a portable biomass reactor that enables thermal decomposition reactions. such as: pyrolysis (e.g., torrefaction and carbonization) and similar thermal reactions for the processing of biomass. A portable bioreactor may be used in a variety of environments and conditions and may use the system and method for dynamically calibrating configuration based on such use of a portable biomass reactor.

Additionally, the system and method may be applicable to the field of carbon-fiber production. In addition to processing plastics, polyacrylonitrile (PAN) polyacrylamide and/or other carbon-fiber precursors to produce carbon fiber, the system and method may enable the processing of biomaterials for the manufacture of carbon-fiber and carbon-fiber products.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

The system and method potentially provide the benefit of a portable biomass reactor that may efficiently process biomass to an energy dense end-product for use.

The system and method may enable control air/gas flow within the bioreactor. Control of the internal air/gas flow potentially provides the benefit of more efficient processing of biomass.

Another potential benefit of controlling the internal gas flow, is that the system and method may enable implementing processing steps that would not otherwise be possible.

Additionally, controlling the internal gas flow may provide the benefit of better environmental management of the bioreactor. With control of the internal gas flow, pollutants may be kept and "cleaned" prior to expelling them out of the bioreactor. Alternatively, the internal gas flow may enable pollutants to be store and not expelled.

Controlling the internal gas flow may further provide potential cooling benefits. That is, the system and method may enable cooling of the biomass in the reaction chamber of the biomass reactor and/or other regions of the reactor.

The system and method may additionally include a variable pitch auger to densify the internal biomass. Modifying the internal biomass density provides the potential benefit of having an ideal desired biomass end-product size.

Additionally, biomass densification provides the potential benefit of improved control over gas exchange within the system.

The system and method may additionally provide the benefit of carbon-fiber production tool. By leveraging the biomass reactors capability for implementing carbonization reactions, the system and method provide the potential benefit of efficient and portable carbon-fiber production.

Additionally, the system and method may provide a portable carbonization tool. As current carbon-fiber production reactors are primarily stationary, the system and method potentially provide the benefit of a portable device for carbon-fiber production.

2. System

As shown in FIGS. 1-4, a system for a multi-chamber biomass reactor includes: a reaction chamber 110, comprising the primary chamber for biomass processing; an outlet chamber 120, adjacent and connected to the reaction chamber; biomass inlet 130, comprising a region for the input of biomass into the biomass reactor; a conveyor system 140, comprising components that actuate the biomass, and other components, through the biomass reactor from the biomass inlet through the reaction chamber, and through the outlet chamber; and a gas exchange system 150, that controls gas flow within the biomass reactor, comprising: at least one air vent 152; and an exhaust 154.

Figure 2:
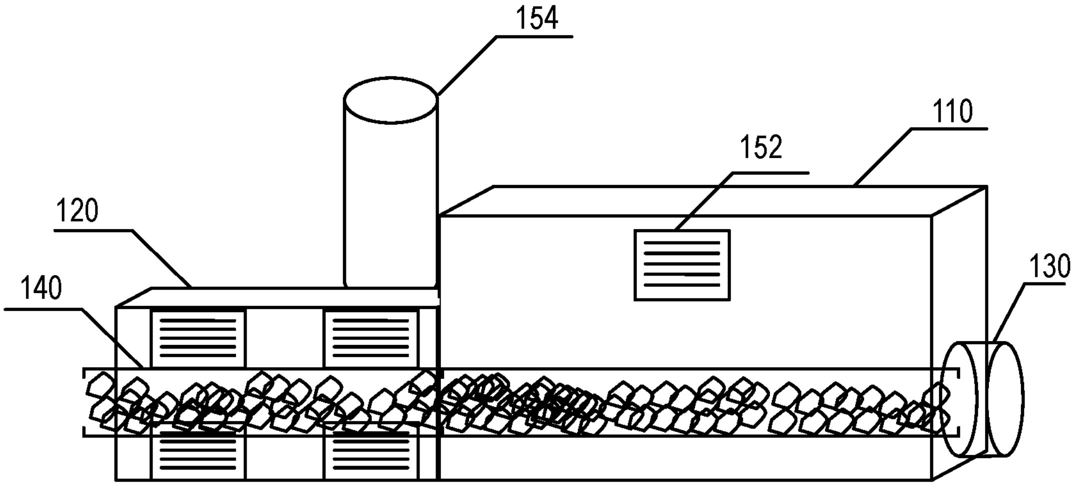
FIG. 2 is an alternative schematic of an example system.
Figure 3:
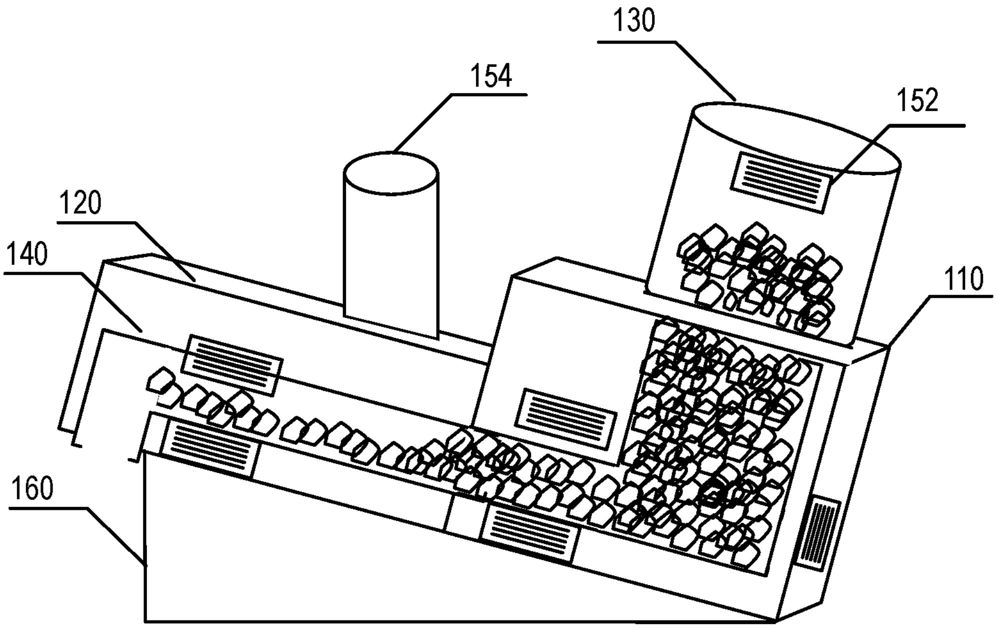
FIG. 3 is a schematic of an example system that includes a variable incline module.
Figure 4:
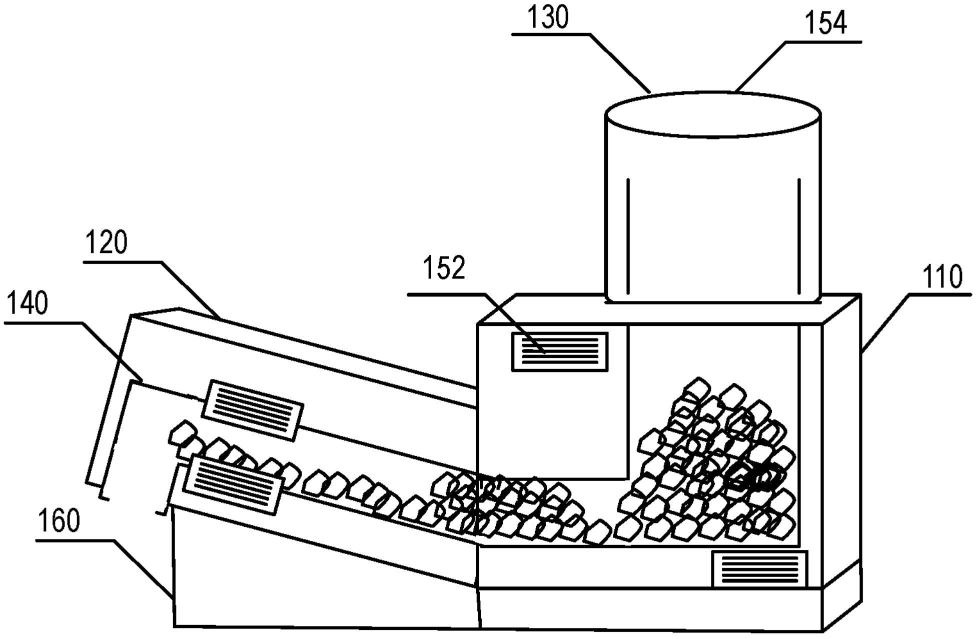
FIG. 4 is an alternative schematic of an example system that includes a variable incline module.

The system functions to process biomass, whereby the system converts input biomass into energy rich products, such as coal, char, bio-fuel, fertilizer, briquettes, electricity, heat generation, and other suitable outputs. The system may have multiple variations, wherein the system may have additional, or fewer components, as shown in a second FIG. 2, a second example schematic of the system. In some variations, as shown in FIGS. 3 and 4, the system may further include: a variable incline module 160, comprising actuating components that can alter the incline and/or height of the reaction chamber, the outlet chamber, and biomass inlet, e.g., the variable incline module may raise the positioning of the outlet chamber such that it is on an incline.

The system functions as a biomass reactor that can hold and process biomass. The biomass reactor may comprise an open or closed system. That is, the biomass reactor may include a storage space where the stored biomass is sealed within, or open to the external environment. In some variations, biomass reactor may have an open and closed operating mode wherein the entire system and/or chambers may change between a closed and an open system.

Dependent on implementation, the system may have additional or alternative components. Additional components may enable distinct or improved operation. For example, additional components may enable processing of different biomasses (e.g., processing of liquid based biomasses), enable production of different outputs/end-products (e.g., carbon fiber production), and improve general functionality (e.g., an insulating layer may improve biomass reactor functionality in extreme weather conditions). Examples of additional components may include: a control unit, a power system (e.g., to power system components and/or to initiate reactions), a sensor system (e.g., to better monitor system functionality), communication system (e.g., for user monitoring and improved operability), a combustion chamber (e.g., enable production of high temperature end products), a cooling system (e.g., steam injection cooling, water mist injection cooling), and/or other suitable components.

As shown in the example schematics of FIGS. 1-4, the system may include multiple implementation variations, wherein components may be altered and positioned differently dependent on implementation. Particularly, dependent on implementation, the system may include varying positions and sizes for: the biomass inlet 130, the air vents 152, and the exhaust 154.

The system may additionally function as a "portable" biomass reactor, wherein the system may be transported and used on-site, as desired. In this manner, the system may be implemented in one region with a set of parameters, and positioning for the processing of one type of biomass processing and then altered and/or moved for the processing of another type of biomass processing. The portable bioreactor functions to enable the storage and processing of biomaterial in locations not normally accessible to larger bioreactors. In some variations, the portable bioreactor comprises a volume approximately between 30 to 250 $m^3$. In some variations, the portable bioreactor is a small size and comprises a volume approximately between 10-30 m3. In some variations, the portable bioreactor is miniaturized and comprises a volume approximately between 1 to 10 $m^3$. In some variations, the portable bioreactor is greatly miniaturized and comprises a volume approximately between 0.5 to 1 $m^3$. Preferably, the portable bioreactor may receive multiple types of biomass (e.g. food trash, wild brush, agricultural residue). The portable bioreactor 110 may preferably change internal conditions to process the biomass. Internal changes may include: thermal conversions (e.g., torrefaction) and biochemical conversions (e.g. fermentation). These processes may be implemented by changes in temperature, pressure, and addition and reduction of gas flow (e.g. oxygen) through the portable bioreactor. In preferred variations, the portable bioreactor may produce primarily solid product bio-fuel (e.g. fertilizer, bio-coal) by decomposing biomass. In one preferred variation, the portable bioreactor no functions in low oxygen conditions.

In one implementation, the biomass reactor may include biomass reactor components similar to the biomass reactor device described in WO2018/213474A1, filed on 16 May 2018, which is hereby incorporated in its entirety by this reference. The system may additionally be applied to alternative or additional forms of transformation systems. In another exemplary application, the system and method are used with biomass reactors including small-scale, process-intensified pyrolysis reactors, wherein these biomass reactors produce liquid products (e.g. bio-oil, diesel, and other fractionated chemical compounds) as well as synthesis gas, from biomass. The system, in some implementations, may be configured for larger form factor biomass reactors or non-mobile biomass reactors.

As a way of processing biomass for a desired usable, energy rich end-product, the system may have multiple processing mode functionalities. The processing mode functionality of the system may be specific to the implemented biomass reactor, the biomass to be processed, and/or the desired end-product. For example, one implemented system may only be specific to receiving one type of biomass material (e.g. wood) and converting it to one end product (e.g. partial oxidation/gasification of wood to produce syngas). A second implemented system may receive multiple types of biomass material (e.g. garbage including paper, wood, food waste) and process them to one end-product (e.g. partial oxidation/gasification of garbage to produce syngas). A third system may receive multiple types of biomass material (e.g. garbage) and covert it to multiple types of end products (e.g. separating garbage and producing biogas, bio-coal, ethanol, and biodiesel from the components using combustion, torrefaction bio-esterification, and fermentation). A fourth bioreactor 110 may receive a single type of biomass material (e.g. wood) and covert it to multiple end-products (e.g. bio-coal and heat).

Figure 5:
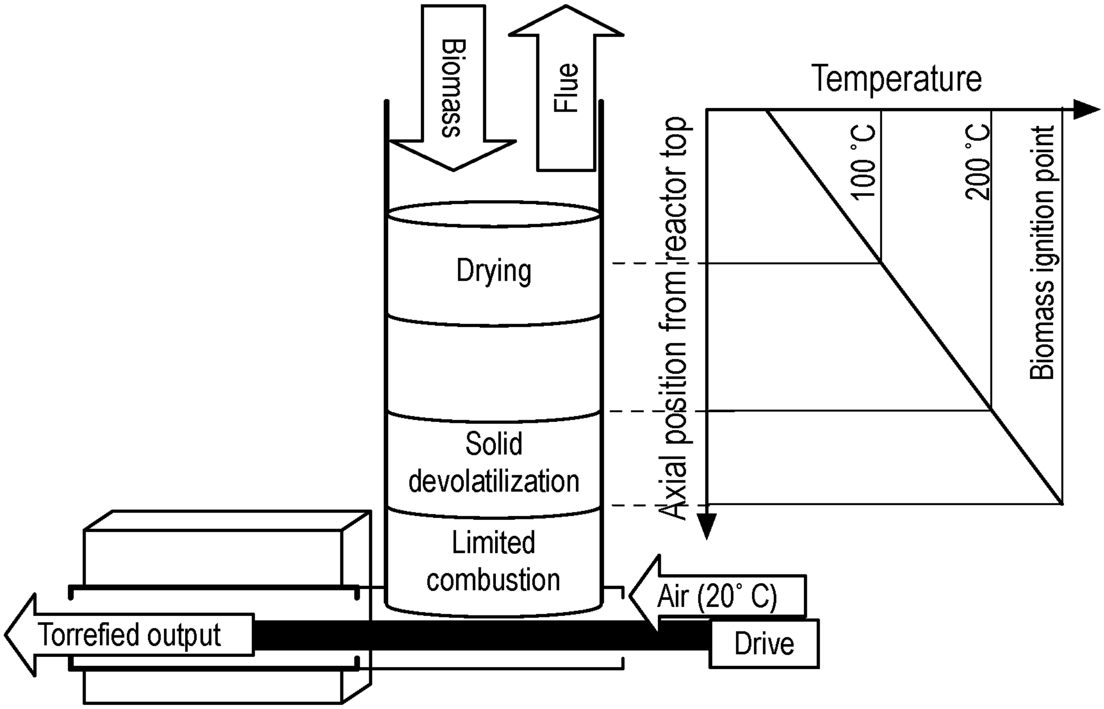
FIG. 5 is a schematic illustration of biomass processing by the system.

In addition to having multiple modes of operation for biomass processing, the system may have modes of operation wherein the air/gas current through the system is controlled with respect to direction of biomass movement within the system. Using system components, the system may enable the direction of air/gas to flow with, against, or irrespective to the motion of biomass processing. That is, the system may have co-current, counter-current, cross-current operating modes wherein the air and gas flow are directed with, against, and relatively orthogonal to the direction of biomass processing. Additionally, or alternatively, the system may enact current operating modes that are in other directions dependent, or independent, of the direction of biomass processing. One example schematic is shown in FIG. 5, wherein biomass enters the system from the flue and processed, and driven out as torrefied output. In this example, air/gas is controlled as partial counter-current, where exhaust gas exists from the main region that the biomass is added.

The types of biomass utilized with the system vary dependent on many factors, e.g. region the biomass is collected and the biomass reactor implementation. Although technically biomass may comprise any plant material (e.g. brush, foliage) or animal material (e.g. carcasses, food waste), biomass here may be used to refer to any organic material that may be converted into a desired end-product preferably a fuel or energy end-product (e.g. biofuel or heat). This may include carbonaceous material that did not originate from plant or animal, particularly any other hydrocarbon compound (e.g. synthetically produced organic material, activated carbon, fly ash, and charcoal dust). In many variations, the biomass is permeable, or semi-permeable, to the passage of air. That is, the biomass may generally allow air to travel through, but once compressed, the biomass may block the passage of air. In some applications of the system, the biomass may breakdown to larger material output, which does not pack or compress. These larger biomass materials (like coconut shells) may result in unique challenges in controlling air travel, which may be addressed by the system. In some variations, biomass may include non-usable material (e.g. as part of garbage collection). In these variations the non-usable material. may be removed from the system. Alternatively, in some variations, the non-usable material may be stored and "processed" with the usable biomass. This may be the case for implementations wherein non-usable material has little to no effect on the end-product.

The biomass reactor end-product is preferably a processed compound from the biomass. More preferably, the end-product is an energy rich compound that is in a form that may be ready to be utilized (e.g., fuel), or requires further processing (e.g., petroleum). The biomass end-product may alternatively be any general desired compound. As used herein, for simplicity of discussion, the biomass end-product will be referred to as "char". Use of the term char for the biomass end-product is in a no way limiting what the biomass end-product may be. Examples of possible end-products include: fertilizer, biofuel, activated carbon (e.g. bio-coal, briquettes), electricity, carbon fiber and heat generation (e.g. from burning the biomass). The end-product may additionally be a material form intended for carbon sequestration. In some variations, the end-product may be a compound that is only partially processed, e.g. petroleum or coke. In these variations, the end-product may be either treated as a final end-product or transported/transferred to another processing plant, or reactor, for further processing.

Figure 14:
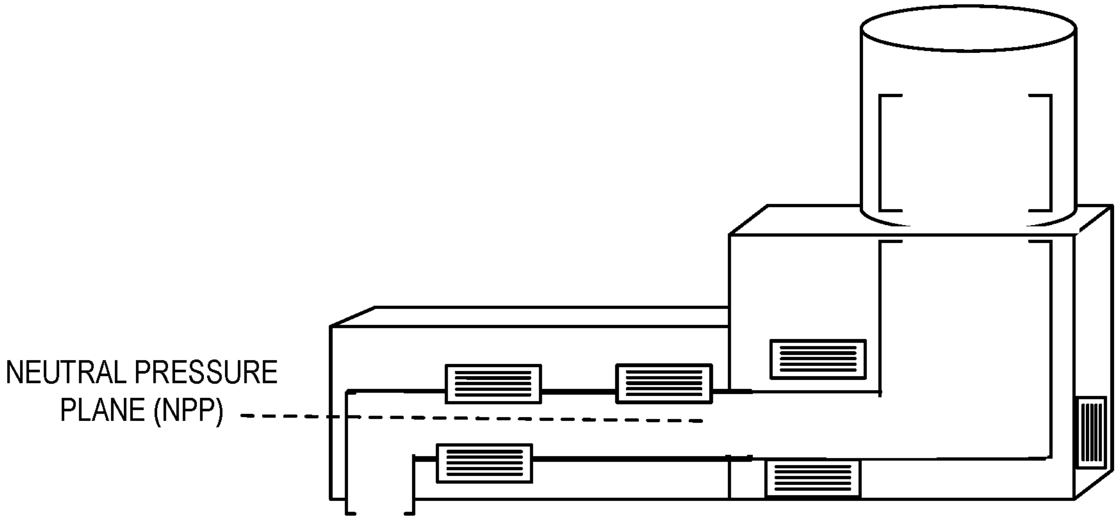
FIG. 14 is a schematic example of a neutral pressure plane with respect to the system.

As defined herein, the neutral pressure plane (NPP) describes the plane, or other surface, wherein the pressure within the biomass reactor matches the pressure outside of the biomass reactor such that gas exchange at NPP is relatively negligible without active pumps (it should be noted that diffusion does still occur). In many variations, NPP is, at least partially, dependent on the ambient air pressure ($p_a$), which decreases with height. Thus, in many variations, gas exchange above the NPP may lead to a net flow of gas out of the biomass reactor, and gas exchange below the NPP may lead to a net flow of gas into the biomass reactor. As part of the biomass functionality, the system may leverage the NPP to facilitate gas exchange. Thus, through utilization of the NPP, the system may enable biomass processing with distinct gas flow with respect to the biomass processing; that is the system may enable co-current, counter-current, and/or cross-current gas flow (e.g., gas flow orthogonal to biomass movement/processing), and/or some combination of currents. As shown in FIG. 14 an example schematic of the system is shown with the NPP is drawn in. In this example, air vents above the NPP may enable exchange of gas to leave the bioreactor and air vents below the NPP may enable exchange of air to enter the system.

The system may include a reaction chamber no. The reaction chamber 110 functions to process the input biomass. Generally, the reaction chamber 110 comprises one, or multiple, chambers that enable a thermal decomposition reaction to occur on the input biomass. Dependent on implementation, any range of thermal decomposition reaction(s) may be implemented for example mild forms, such as torrefaction, and extreme forms, such as carbonization. In some variations, reaction chamber may enable more complex reactions, wherein pyrolysis is only a part of the reaction (e.g., combustion or gasification). In other variations, the reaction chamber may enable other types of biomass processing, e.g., thermal decomposition.

As part of the reaction chamber 110 functionality, the reaction chamber may include components enabling changes in thermodynamic properties. For example the reaction chamber no may be enabled to make intrinsic changes, such as: increasing/decreasing temperature (e.g., heat pump, or a combustion reaction), increasing/decreasing pressure (e.g., changing chamber volume or preventing exhaust to leave); and/or extrinsic changes, such as: adding/removing biomass material (e.g. separating different biomass components), adding/removing other components (e.g. removing a reaction waste component), increasing/decreasing flow of gas/liquid components (e.g. increasing oxygen flow for combustion).

In some variations, the reaction chamber no may comprise multiple chambers, wherein during biomass processing, the biomass may be moved material into different chambers and initiate different processes in these different chambers. These chambers may enable distinct stages of biomass processing. For example, filtration, oxidation, reduction, dissolution, etc.

The reaction chamber no may include multiple processing modes, wherein these processing modes may dependent on the input biomass, desired end-product, and potentially other factors (e.g., environmental conditions, reaction chamber capability, etc.). The reaction chamber no may thus be enabled to "process" the biomass by changing the internal conditions of the chamber. That is, processing functions to produce the desired end-product by inducing physical and chemical changes within biomass. Dependent on implementation, distinct processing modes may be a property of the bioreactor itself (e.g. reaction chamber 110 properties) or specific steps implemented within the reaction chamber for a type of biomass input or type of desired end-product.

The system may include an outlet chamber 120. The outlet chamber functions as a secondary stage and/or post-processing of the input biomass. The outlet chamber 120 may be directly connected to the reaction chamber no, such that the input biomass may directly travel into the outlet chamber. The outlet chamber 120 may additionally include an outlet, such that processed biomass may exit the bioreactor. Alternatively, dependent on implementation, the outlet chamber may be connected to another bioreactor chamber no.

In some variations outlet chamber 120 may function as a char cooling region. That is, char may be actively and/or passively cooled in this region. In these variations, the outlet chamber S120 may include open, or semi-open, regions (e.g., an air vent) such that the outlet chamber may be cooled by the external ambient temperature. Additionally, or alternatively, the outlet chamber 120 may incorporate other methods of cooling (e.g., liquid cooling, spraying of water mist or steam).

In some variations, the outlet chamber 120 may function to enable extended, or a second stage, processing of the biomass. As shown in FIG. 2, in these variations, the outlet chamber may also be connected to a flue, or other exhaust port, such that heated gas and/or compounds may be streamed along the biomass to help process the biomass.

The system may include a biomass inlet 130. The biomass inlet functions as an entry point for the biomass. The biomass inlet 130 may either directly connect to the reaction chamber 110, or may include "piping" leading to the reaction chamber. Dependent on variation, the biomass inlet may be able to open and close. Alternatively, the biomass inlet is always open. In some variations, the system may have multiple biomass inlets 130.

In one variation, as shown in FIGS. 3 and 4, the biomass inlet 130 also functions as the system flue. That is, the biomass is input into the system through the same passage as exhaust gas is released from the system. The biomass inlet 130 also comprising the flue functions to enable counter-current gas exchange. Counter-current gas exchange may enable efficient heating of the biomass by the exhaust gas, potentially enabling better activation/ignition of the biomass material.

In another variation, as shown in FIGS. 1 and 2, the biomass inlet 130 may be positioned on the side of the reaction chamber 110. A side entry biomass inlet 130, may function to provide easier access, and enable more efficient input of biomass into the biomass reactor. Additionally, a side entry biomass inlet 130 may enable better co-current processing. That is, the side entry may enable more efficient incorporation of co-current air/gas flow, wherein the input air and exhaust gas flow in the same direction as the direction of biomass processing.

Figure 6:
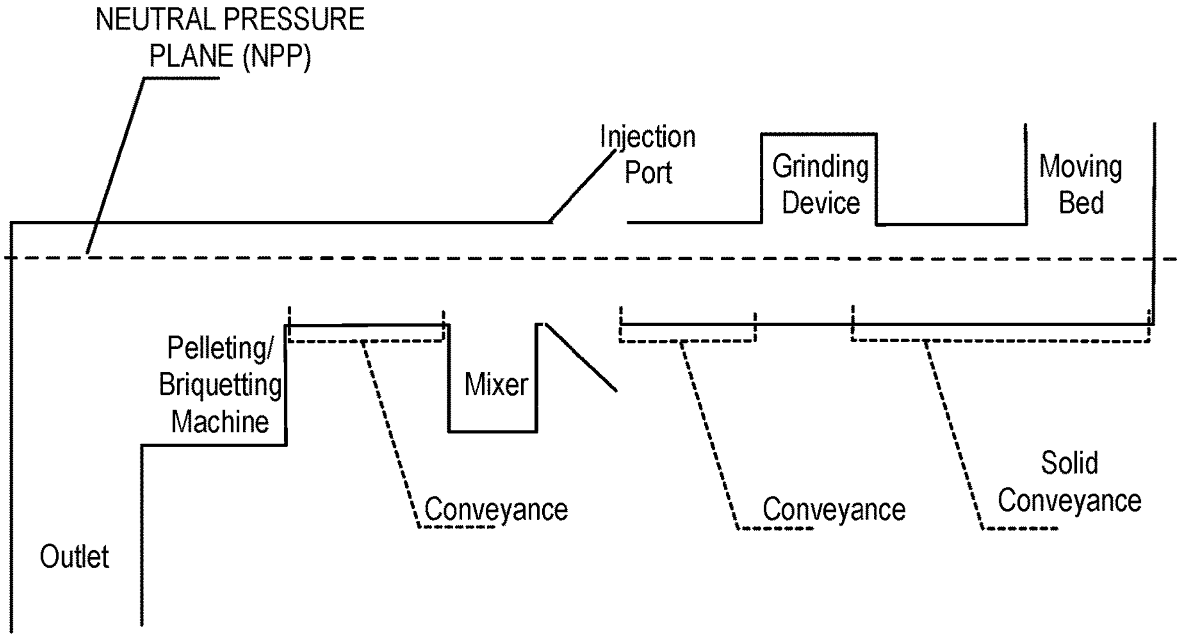
FIG. 6 is a schematic of an example conveyor system.
Figure 7:
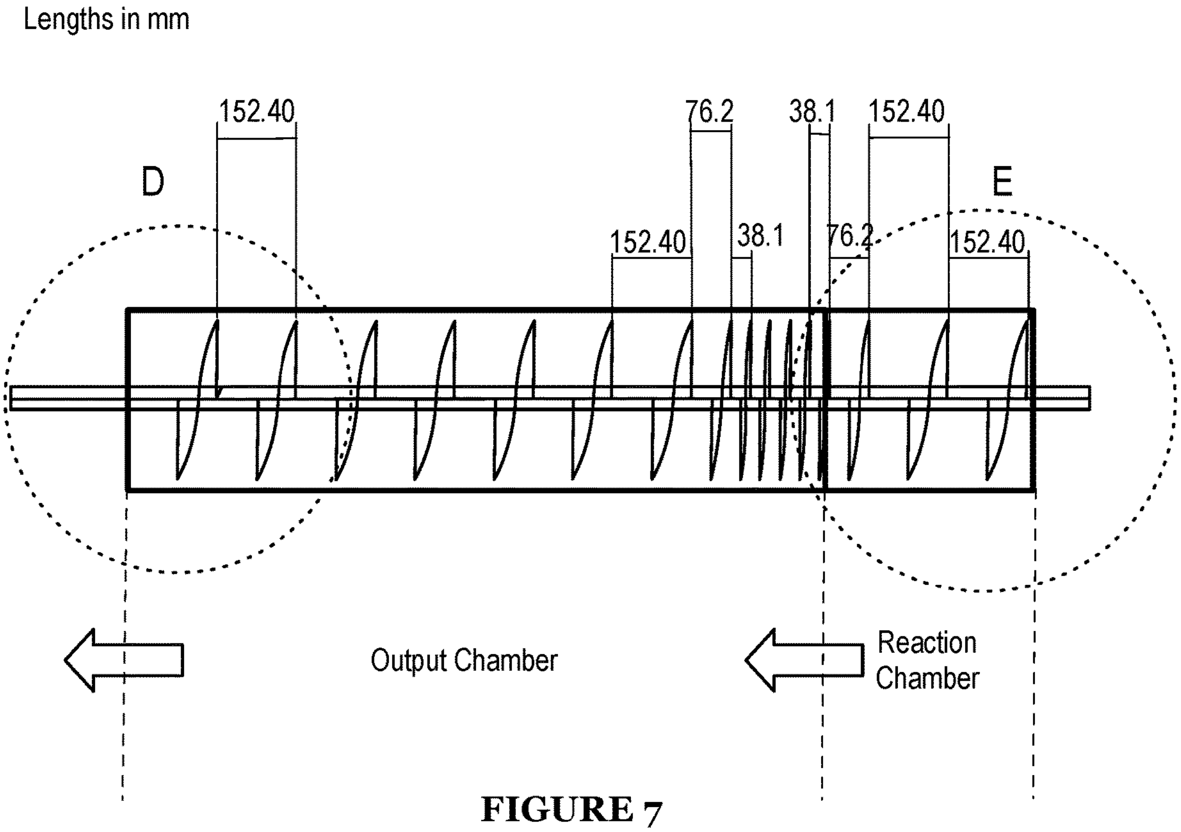
FIG. 7 is a schematic of an example variable-pitch auger.
Figure 8:
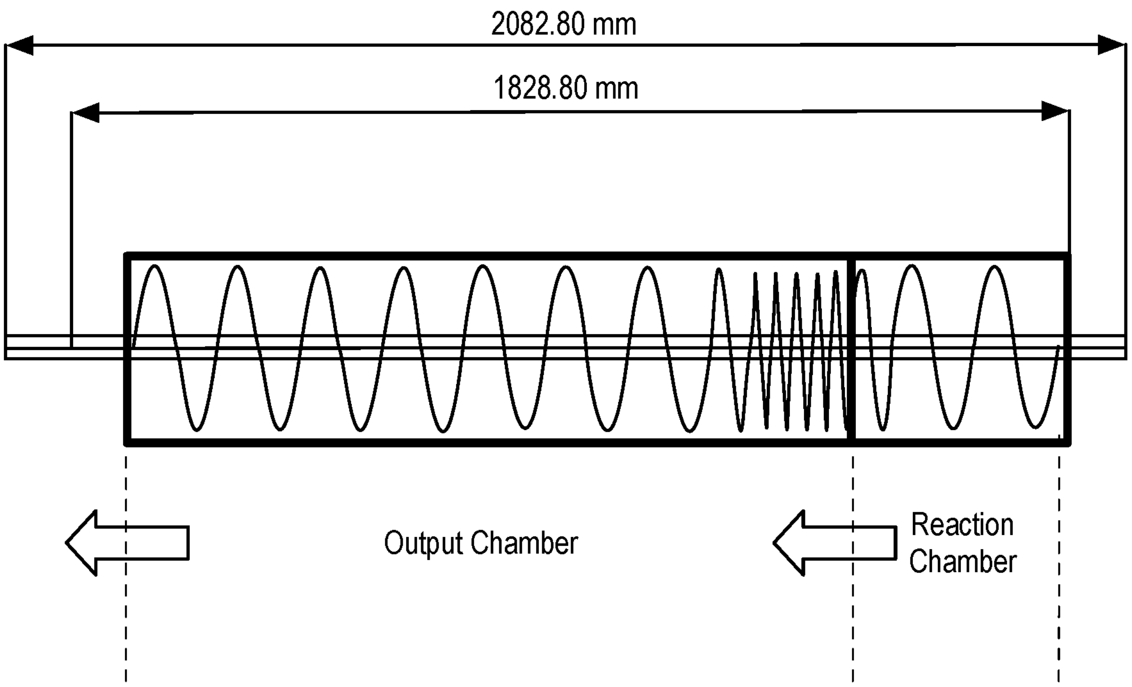
FIG. 8 is a subsection of the example variable-pitch auger.
Figure 9:
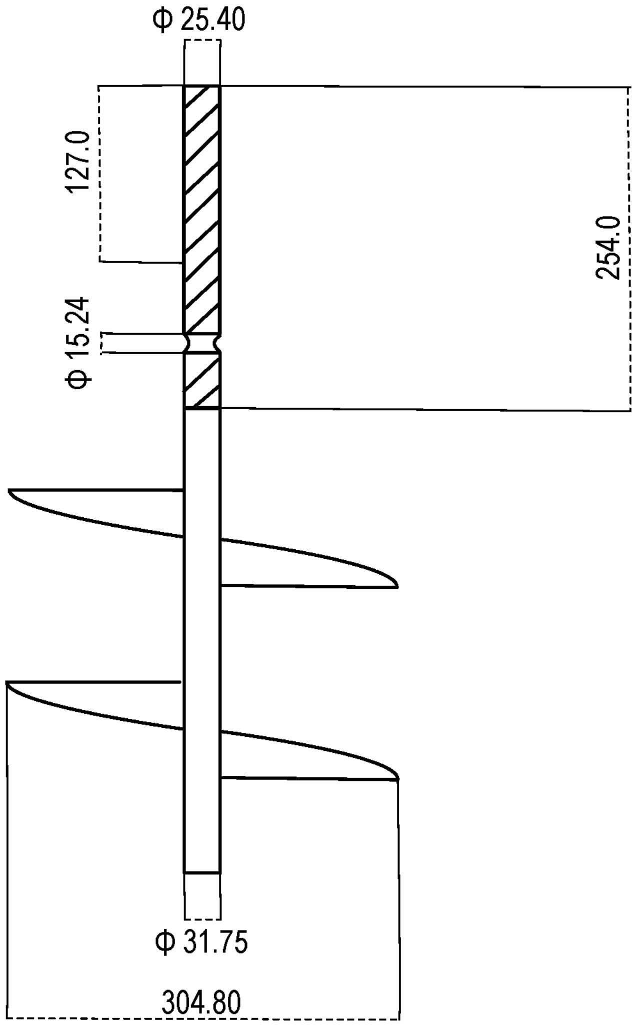
FIG. 9 is a subsection of one end piece of the example variable-pitch auger.
Figure 10:
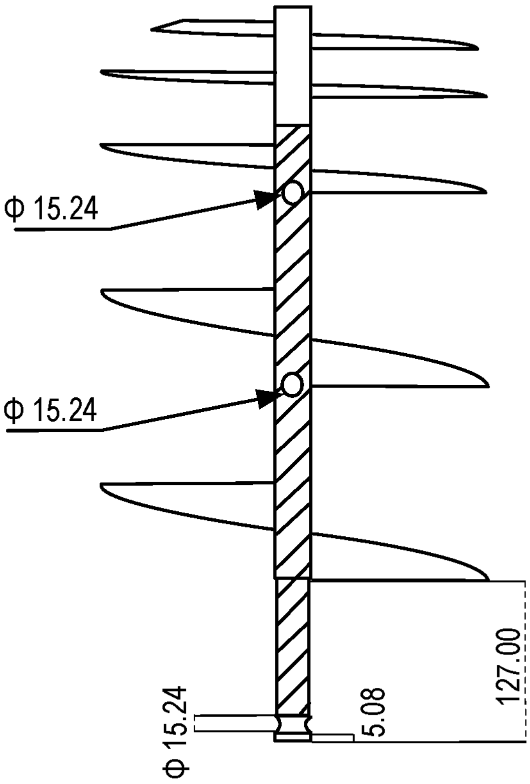
FIG. 10 is a subsection of the other end piece of the example variable pitch auger.
Figure 11:
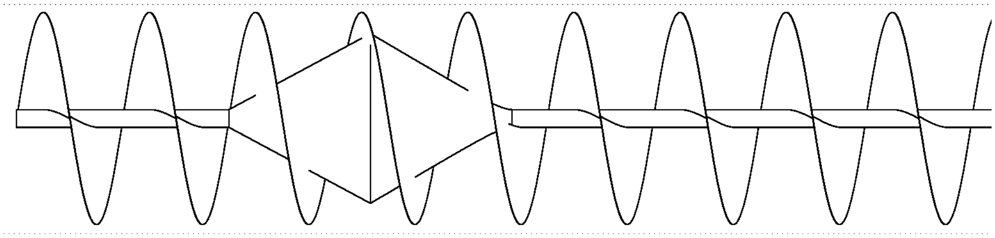
FIG. 11 is a schematic of an example variable shaft auger.

The system may include a conveyor system 140. The conveyor system functions to transport the input biomass through the system; from the biomass inlet 130, through the reaction chamber 110, through the outlet chamber 120, and out of the system. Additionally, the conveyor system 140 may take part in altering the physical properties of the biomass (e.g., compressing, spreading out, mixing, change biomass processing residence time, etc.). The conveyor system may include a drive and actuating components. In variations that include a variable incline module 160, the conveyor system 140 may work in conjunction with the variable incline module; wherein the conveyor system may leverage system incline to improve desired effects. In some variations, the conveyor system 140 may include a pelleting machine, briquetting machine, and/or a variable pitch auger. As shown in FIG. 6, one sample conveyor system 140 comprises a moving bed for solid conveyance, a grinding device, a pelleting/briquetting machine and an injection port. In this example, the injection port may enable injection of a binding agent, char cooling fluid, or, other fluid, to make the char more malleable for pelleting.

Dependent on implementation, the conveyor system 140 may also allow transport of biomass and biomass end-product forward or backward. Backward motion of biomass, may enable extended amount of processing (e.g. for carbonization), and/or enable multi-stage processing. Additionally, backward motion of biomass may improve mechanical conveyance of biomass by dislodging stuck biomass.

In some variations, the conveyor system 140 includes a moving bed that carries the biomass through the system. Dependent on implementation, the conveyor system may comprise a single bed, wherein the conveyor system actuates the biomass uniformly through the system. Alternatively, the moving bed may comprise multiple beds, such that each segment transports the biomass at different rates (i.e. non-uniform actuation). For example, a first moving bed segment in the reaction chamber no may slow the transport of the biomass such that the biomass is sufficiently processed into char. A second bed segment, at the end of the reaction chamber no and beginning of the outlet chamber 120, may move slowly (or not at all) enabling buildup of processed biomass (e.g., to prevent gas flow into the outlet chamber 120. A third bed segment, within the outlet chamber 120, may move at the desired rate such that the char is sufficiently cooled. In many variations, the ratio of diameters of each segment is controlled. In some variations, this means the ratio of the size of the outlet chamber 120 to the diameter of the moving bed does not exceed a certain ratio, wherein the size of the outlet chamber refers to shortest cross-sectional length (e.g., height, width, diameter for a circular outlet chamber, etc.) In one example, this ratio does not exceed 1. In a second example, this ratio does not exceed 0.5. In a third example, this ratio does not exceed 0.25. In some variations, this sizing ratio may also be at least partially dependent on the biomass size.

Additionally or alternatively to the moving bed, the conveyor system 140 may include other components to implement non-uniform actuation. For example, the conveyor system may include augers (e.g., uniform augers, variable pitch augers), rotary drums, etc. That is, the conveyor system 140 may comprise any mechanism for the non-uniform actuation of the biomass along a defined path of actuation. In addition to enabling better processing of the biomass by allowing the biomass to stay in a desired region for a relatively optimized amount of time, non-uniform action may function to enable compression of the biomass. Biomass compression may enable better control of gas exchange flow (e.g., by slowing or blocking gas flow). In one example, the conveyor system 140 may be implemented such that enables compression of the biomass in proximity to the region where the reaction chamber no and the outlet chamber 120 are connected, thereby restricting, reducing, or plugging, air/gas flow between the reaction chamber 110 to the outlet chamber 120. Compression of the biomass places the biomass under pressure (including but not limited to a compression or extrusion process such as a narrowing of the channel (or increasing the pitch of a screw auger for systems that include a variable pitch auger).

In some variations the conveyor system 140 comprises an auger. As shown in FIGS. 7-10, the auger may comprise a variable pitch auger. Preferably, the auger includes a drive shaft, as shown in FIG. 5, wherein the drive shaft drives the auger. As shown in the FIGS. 7-10, the auger may have uniform pitch through the main regions of each chamber, with variability between chambers. For example, the variable pitch auger may have a relatively uniform pitch through the majority of the reaction chamber no and the majority of the outlet chamber 120, with a denser pitch in the region between the two chambers. Alternatively, the auger pitch is gradually reduced in, or past, the reaction chamber no along the initial section inside the outlet chamber 120 (i.e., char-cooling segment). As mentioned previously, the variable pitch may enable densification of the biomass, creating a "plug", such that air flow may be reduced or restricted between the reaction chamber no and the outlet chamber 120. Additionally or alternatively, the variable pitch may enable changing the biomass processing residence time. Biomass residence time may be increased or decreased in the outlet chamber 120 by adjusting the pitch of the auger at that location for the same speed of rotation. This may be used to achieve a desired temperature for the char at the outlet.

Reducing pitch of the auger may compress the torrefied biomass (whose volume has been previously reduced in the reaction chamber). By haying the pitch of the auger localized to a particular region, the torrefied biomass may be compressed in a targeted region of the outlet chamber 120. This will raise the level of the torrefied biomass and fill up the axially projected cross-sectional area of the outlet conduit. The ratio between the reduced pitch and the original pitch (in the reaction chamber) may be adjusted such that the axially projected cross-sectional area is more than a desired quantity. In one variation, the projected cross-sectional area is more than 75% full. In other variations, the projected cross-sectional area is more 99% full. If the level of the torrefied biomass is known, then the ratio of reduced pitch can be roughly calculated/predicted as the ratio of the full axially projected cross-sectional area to the cross-sectional area in the conduit actually occupied by torrefied biomass. This may create increased fluid resistance for air to freely enter the moving bed and into the outlet chamber 120, therefore weakening any chimney effects. In some cases, the ratio of the reduced pitch to the original pitch can be further increased such that the torrefied biomass is being compressed into smaller pieces. This fracturing of large-particle biomass into smaller particles may further serve to increase the fluid resistance in the area with reduced pitch. This, coincidentally, may serve the dual purpose of reducing the size of torrefied biomass, which is often a desired postprocessing step after torrefaction or any thermochemical treatment. If reduction in the torrefied biomass particle size is undertaken, then the desired average particle output size may be controlled. In one variation, the output size are particles smaller than 100 cm. In a second variation, the output particle is smaller than 10 cm, Dependent on implementation, the output particle size may be in any range greater than 1 micron.

From the reaction chamber 110, the pitch can reduce gradually over a few turns, or reduce abruptly. Abrupt reduction may create a more sudden compression of the torrefied biomass, which will translate to more torque required on the part of the motor, and to a higher mechanical stress on the auger; which may lead to mechanical failure. Thus in many variations, a gradual reduction of pitch may be more effective at creating the air "plug". Alternatively, an abrupt change in pitch may be incorporated in variations where drive torque is taken into account. In some variations, the region of reduced pitch may extend throughout the length of the char-cooling segment.

In other variations, the region of reduced pitch may last only a few turns before the pitch is increased again in the direction of the char outlet. The increase in pitch may be, either abrupt or gradual over a few turns. For these variations, the region of reduced pitch may be at least a few auger turns (>2) in order to create an effective air "plug".

In some variations, as shown in FIGURE ii, the outer diameter (OD) of the auger shaft may gradually, or suddenly, increase in or past the reaction chamber 110, in the initial section inside the outlet chamber segment 120. This may function to compress the biomass and create an air plug, wherein the biomass is compressed between the auger shaft and the tube walls of the conveyor system. Dependent on implementation the pitch may, or may not, be maintained constant throughout. For constant pitch augers, the increased auger shaft diameter may create the same effect by forcing the torrefied biomass to compress. The ratio between the expanded auger shaft OD and the original auger shaft OD (in the reaction chamber 110) may be adjusted such that the axially projected cross-sectional area is filled up to a desired amount. For example, the cross-sectional area may be: 75%, 90%, 95%, or 99% filled up If the level of the torrefied biomass is known, then this ratio may be roughly calculated/predicted as the square root of the ratio of the full axially projected cross-sectional area to the cross-sectional area in the conduit actually occupied by torrefied biomass before this solution is implemented. Increasing the size of the auger shaft may create the same compressive effect and air "plug" effect as previously described and may cause the biomass particles to be reduced to a smaller size (achieving a "grinding" effect). The reduction of torrefied biomass particle size may be controlled. In one variation, the output size are particles smaller than 100 $cm^3$. In a second variation, the output particle is smaller than 10 cm, Dependent on implementation, the output particle size may be in any range greater than 1 micron.

Dependent on implementation, from the reaction chamber 110, the auger shaft OD may increase gradually over one or more turns, or abruptly. An abrupt increase in the auger shaft OD may create a more sudden compression on the torrefied biomass, which will translate to more torque required on the part of the motor. This may in turn lead to a higher mechanical stress on the auger and therefore potential failure if not initially accounted for. However, an abrupt increase in auger shaft OD may also be implemented for creating the air "plug".

In some cases, the region of increased auger shaft OD can last throughout the length of the outlet chamber 120. Alternatively, the increased auger shaft OD may last only one or more turns before the auger shaft OD is reduced again in the direction of the char outlet, either abruptly or gradually over a few turns. In variations that include an increased auger shaft diameter, the region of increased auger OD may be at least one auger turn in order to create an effective air "plug".

Due to the potentially increased wear and tear on the auger in the reduced-pitch region conveying highly abrasive substances such as torrefied biomass, is recommended that the auger be made from abrasion-resistant material or treated with abrasion-resistance techniques such as case hardening, in order to avoid the need to constantly repair/reweld worn parts of the auger. If reduction in the torrefied biomass particle size is undertaken, then the desired average particle output size may be smaller than 100 cm, smaller than 10 cm, smaller than 1 cm, smaller than 1 mm, smaller than 100 microns, smaller than 10 microns, smaller than 1 micron. This solution is illustrated below.

The auger may be composed of any type of material. Due to the potentially increased wear and tear on the auger in, either in reduced pitch regions or increased OD shaft diameter, conveying highly abrasive substances such as torrefied biomass, the auger may be preferably made extra durable. In some variations, the auger may be made from abrasion-resistant material or treated with abrasion-resistance techniques, such as case hardening. This may provide the benefit of avoiding the need to constantly repair/reweld worn parts of the auger.

In variations where, the system is at an incline, or particularly a non-uniform incline (e.g., FIG. 4), the conveyor system 140 may incorporate multiple augers (e.g., one auger for each incline region). Alternatively, the auger may have one, or more, flexible joints enabling the auger to bend and rotate along inclines.

Figure 12:
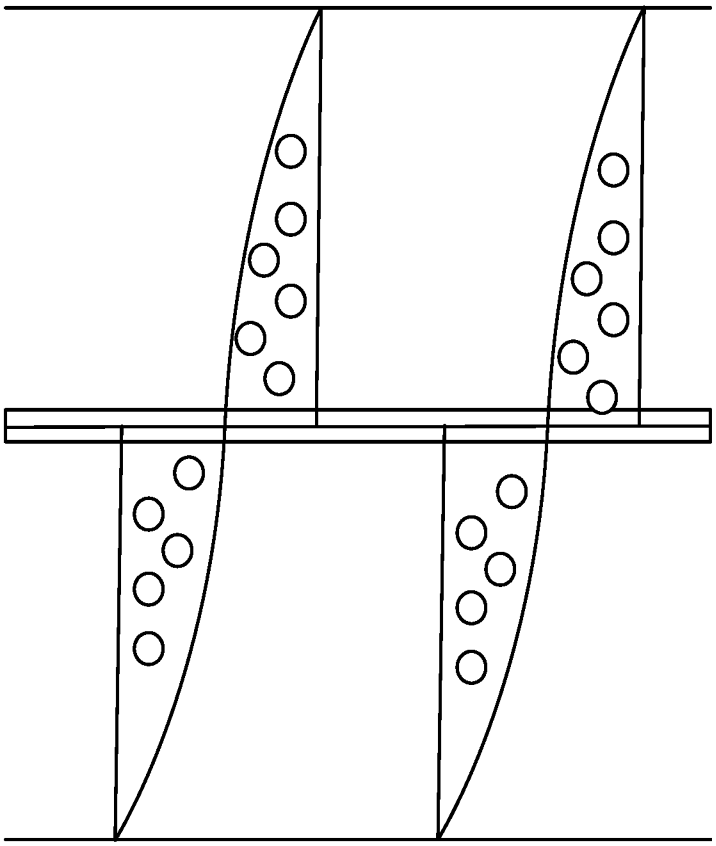
FIG. 12 is a schematic of an example auger flight with holes.
Figure 13:
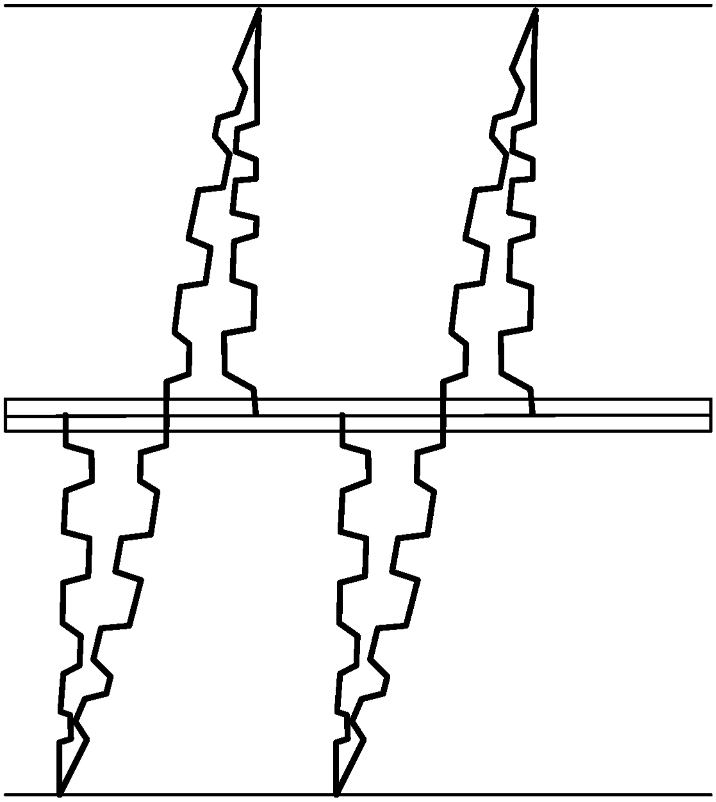
FIG. 13 is a schematic of an example auger with perforated flights.

In many variations, the flights of the auger are sufficiently long and shaped such that the auger flights form a relatively air tight (or low gas exchange) path for biomass conveyance. These form-fitting flights function to minimize/control gas flow through the system, particularly for the case between the reaction chamber no and the outlet chamber. In some variations, the flights may have perforations, or holes, within a given region to enable gas flow. For example, as shown in FIG. 12, the auger flights of the auger may have holes within the reaction chamber no in order to allow the penetration of gas to the different compartments, thereby heating up the unreacted biomass more quickly and improving the overall reaction stability. The size of the perforation should be smaller than the biomass particle in the reactor. Dependent on implementation, the perforation may have a diameter less than 1 cm, 1 mm, or 0.1 mm. In some variations, e.g., for coconut shells, the perforations may have a diameter between approximately 0.1 mm-10 mm. These series of perforations may also be in the form of a mesh of sufficient thickness and strength to move biomass along. As shown in FIG. 13, a different example of the perforation in the auger flights may comprise notches at the edges of the auger flights, or larger holes on the surfaces of the auger flights whose hole diameters are equal to or larger than the typical size of the biomass particles. In such cases, the perforations (notches or holes) not only allow hot gas to circulate, but also a small amount of biomass (which can be hot and reactive) to remain behind rather than being carried away by the auger flight.

The conveyor system 140 may comprise a grinder. The grinder may function to grind up the biomass. The grind up the biomass into smaller pieces (of sizes not less than 10 microns and not more than 100 cm). The grinder may comprise an in-line grinder. Additionally or alternatively, the grinder may include a hammer mill.

In some variations, the conveyor system 140 may include a drying bed. The drying bed functions to help dry the biomass during transport along the conveyor system. The drying bed may comprise an inlet of drying equipment arranged in-line, within or near the end of the reaction chamber no. The drying equipment may comprise a belt dryer, a rotary drum dryer, or any type of commercially available drivers now, or in the future. Alternatively, the drying equipment may comprise a heated bed, wherein a heat transfer element (e.g., an outer jacket in another reactor, or heating element) is used to transfer heat to the bed.

The conveyor system 140 may include one, or more, injection ports. The injection port functions to enable the addition of fluids, chemicals, gases, etc. to the biomass. In some variations, the conveyor system 140 includes an injection port within the reaction chamber no. Alternatively, the injection port may be situated within the outlet chamber 120 region of the conveyor system 140. In one example, the injection port may enable addition of binding agent to the biomass. The binding agent may help "solidify", or create a more dense biomass. Examples of binding agents include: cassava, corn, starch, glue, and water.

In many variations, the conveyor system 140 transports the biomass out of the system. In some of these variations, the conveyor system 140 may either organize the exported char. In some variations, the conveyor system 140 may deposit the char immersed in water, immediately after the outlet such that the solids emerging from the biomass reactor fall into the water without the ability for any air to enter. In one example the conveyor system 140 directly deposits the char in water (in a container) where the level is right at the solid outlet for the solid to fall into the water. In another example, water is injected into the conveyor system 140 and thus immersing the char prior to deposition.

The system may include a gas exchange system 150. The gas exchange system 150 functions to control gas and air flow within the biomass reactor. The gas exchange system 150 may control gas and air flow in conjunction, with the conveyor system 140 and the variable incline module 160. The gas exchange system 150 may include at least one air vent 152, wherein air vents enable gas exchange with the exterior of the bioreactor; and an exhaust 154, for the release of gas from the reactor. In some variations, the gas exchange system may include piping that connects air vents, exhausts, and system chambers. This piping may be further used to insulate or heat chambers (e.g., piping may direct exhaust off-gas around the reaction chamber 120 to heat it).

The gas exchange system 150 may include at least one air vent 152. The at least one air vent 152 enables passive gas exchange with outside of the biomass reactor. The at least one air vent 152 comprises a first air vent positioned on the outlet chamber 120. The gas exchange system may include multiple air vents 152 situated on the reaction chamber 110 and/or outlet chamber 120. Dependent on implementation air vents 152 may comprise active (i.e. pump air/gas into or out of the system) or passive (i.e., allow passive air/gas flow into, or out of the system). In some variations, air vents 152 may be turned "on" to allow active flow, or "off" to allow only passive flow. Additionally, air vents may be "open" or "closed", wherein open air vents enable gas exchange, while closed air vents are sealed and do not allow gas exchange.

In some variations, the at least one air vent 152, further includes a second air vent positioned on the reaction chamber 110. Dependent on implementation, the second air vent 152 may be angled as compared to the incline of the reaction chamber no. In some variations, the angle of the second air vent 152 may be changed as required. In this manner, the second air vent may function to reduce the chimney effect. The second air vent 152 may enable active or passive air flow. In some variations, the secondary air vent 152 may use this positioning to reduce emissions and pollutants. That is, the secondary air vent 152 may be inclined to reduce the positive air pressure in the reaction chamber 110, thereby aiding to control gas exchange. In some variations, the secondary air vents 152 may have operating mode to automatically change the inclination of the secondary air vents 152 to improve reactor function and/or reduce reactor emissions. For example, in a first secondary vent operating mode, the inclination of the secondary air vent 152 is increased or decreased. These changes may occur to: increase the chimney effect, provide more oxygen for mixing to improve combustion, flu smoke is coming out too hot, or billowing/black smoke is emitted by the biomass reactor.

Air vents 152 may be positioned within the biomass reactor as desired per implementation. In some variations, the gas exchange system may comprise air vents 152 along the surface of the biomass reactor wall at different heights. Air vents 152 at different heights. Passive air vents at different heights may work as "test ports". In this manner air vents may be dedicated test ports, or used as test ports when required. Test ports may be used to detect the neutral pressure plane (NPP) by detecting the direction of air flow through the test ports. As shown in FIG. 14, the NPP may be determined by monitoring the test ports, wherein passive air flow would be directed outwards above the NPP and passive air flow would be directed inwards below the NPP.

In some variations, air vents 152 may be situated close to the hottest region in the reaction chamber 110. These air vents 152 may function as an air curtain and useful to incorporate as part of a drying gas. In some variations, air vents 152 used as air curtains may be positioned as pairs, facing opposite each other on the reaction chamber wall no. Additionally, the air curtain effect may play a role increasing the positive pressure within the reactor, thereby affecting the location of the NPP.

In some variations, the gas exchange system may include gas vents. Gas vents comprise inlets for the incorporation of specific gases into a specified chamber of the biomass reactor (e.g., outlet chamber gas vent, reaction chamber gas vent). Gas vents may comprise passive or active input of gas into the system as desired by implementation.

In one variation, a gas vent may be situated from near the biomass outlet. The gas vent may pump in a "drying" gas in the opposite direction, to the direction of conveyance of the torrefied biomass. Preferably the drying gas is an inert gas, such as steam (which can be low-temperature) or nitrogen. The drying gas may fill the char-cooling segment. In some variations, the drying gas may also be drawn away at one or more exit ports/air vents, before reaching the reaction chamber 110. The drying gas may prevent the hot torrefied biomass from reacting, and can further cool the torrefied biomass more effectively.

The gas exchange system 150 may include an exhaust 154. The exhaust functions to carry away the waste and/or off-gas created from functioning of the biomass reactor. In many variations, the exhaust comprises 154 a flue, used to dissipate the gas. The flue may comprise one, or more "chimney" stacks, connected to the bioreactor, either directly, or through sets of piping. Dependent on implementation, the flue may be connected to the reaction chamber no, as shown in FIG. 3, or connected to the outlet chamber, as shown in FIG. 1. Alternatively, the flue may be not connected to either chamber, but have piping connecting it to one, or both, chambers. In some variations, the flue may play multipurpose role. For example, the flue may also serve as the biomass inlet 130, such that biomass is input into the reactor via the flue.

Figure 15:
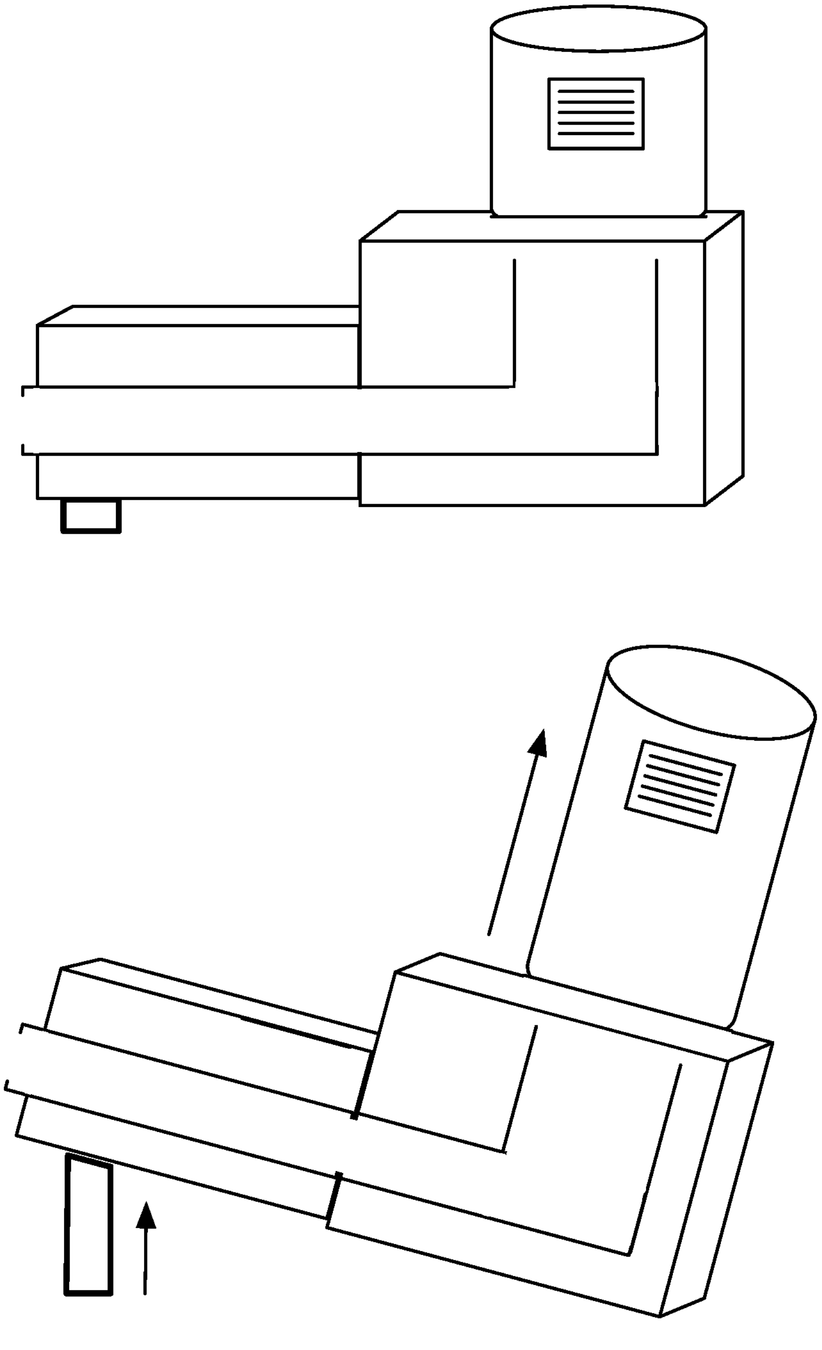
FIG. 15 is a schematic example of system component actuation.

The flue may be of any desired height (i.e., flue length,). The height of the flue (also referred to as flue length, flue height, flue stack height) may be dependent on the bioreactor implementation. The flue length, may function to regulate bioreactor temperature. In one variation, the flue length is approximately 0.1-1 times the height of the outlet chamber 120. In one variation, the flue length is approximately 2-3 times the height of the outlet chamber 120. In another variation, the flue length is approximately 3-4 times the height of the outlet chamber 120. In one variation, the flue length is approximately 4-5 times the height of the outlet chamber 120. In one variation, the flue length is approximately 5-6.5 times the height of the outlet chamber 120. As shown in FIG. 15, in some variations, the flue comprises an extendable element such that flue length may be vary. Dependent on implementation, flue extension may be automated (e.g., servomotors may extend or retract the flue) or may be extended manually. Extension of the flue may occur dynamically during operation of the bioreactor, or while the bioreactor is “off”. In one variation, the flue length variance may comprise a range from ¼ of the outlet chamber 120 height to 4 times the outlet chamber height. In one variation, the flue length variance may comprise a range from 2 times the outlet chamber 120 height to 6.5 times the outlet chamber 120 height. Dependent on implementation, the range of the of the flue length variability may be different.

Figure 16:
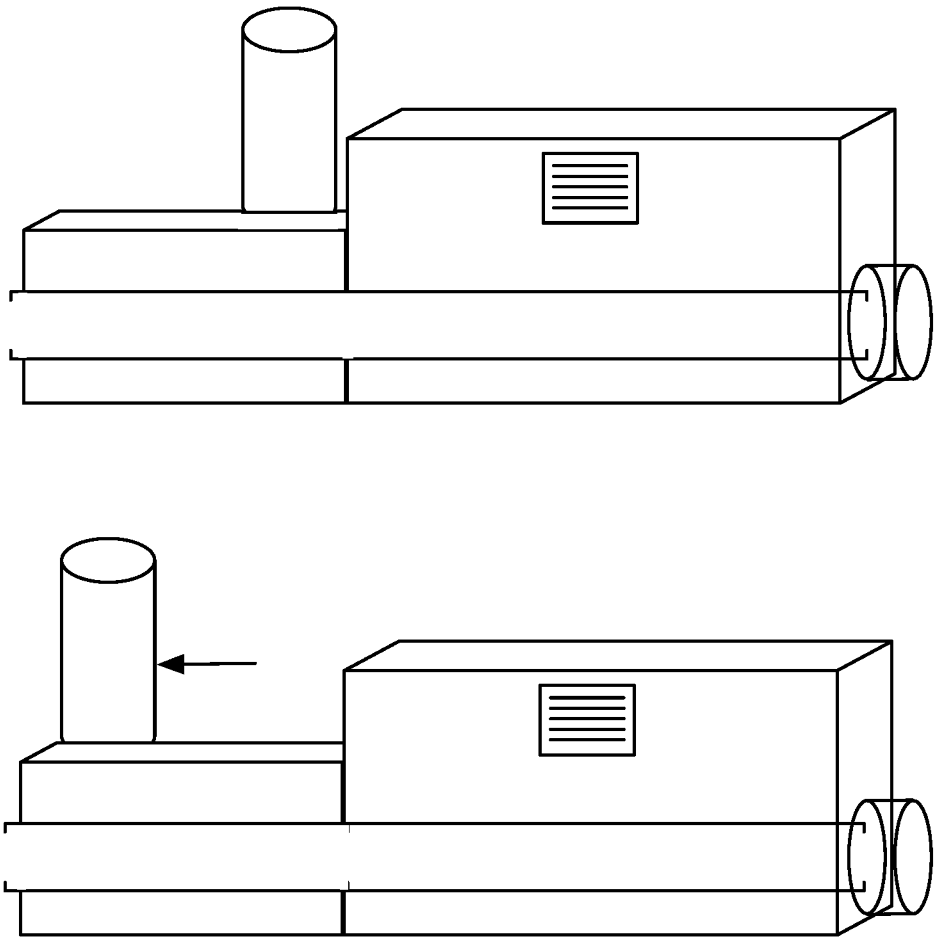
FIG. 16 is a schematic example of flue elongation.

In some variations, the position of the flue may be changed. Change of the flue position may function to extend the time that biomass is processed. For example, movement of the flue towards the end of the reaction chamber 110 may increase the time of torrefaction for the biomass and effectively “extend” the length of the reaction chamber 110. Additionally, movement of the flue may alter air currents within the bioreactor. In some variations, the flue may be positioned on the outlet chamber 120 in proximity to the side of the outlet chamber directly adjacent to the reaction chamber no. In another variation, the flue is positioned on the outlet chamber 120 in proximity to the side of the outlet chamber furthest away from the reaction chamber no. In another variation, the flue is positioned on the reaction chamber 110. In some variations, the flue comprises an actuatable component such that the flue position may be changed along the direction of biomass conveyance. As shown in FIG. 16, in some implementations, the flue may be moved and positioned along the outlet chamber 120. In some implementations, the flue may be moved and positioned along the reaction chamber no. In some implementations, the flue may be moved and positioned along the entire bioreactor (i.e., including both the reaction chamber 110 and the outlet chamber 120). Dependent on implementation movement of the flue may be done manually, or mechanically (e.g., movement by servomotors). Dependent on implementation, movement of the flue may occur dynamically, during operation of the flue and/or while the bioreactor is inactive. The flue may additionally or alternatively have mechanically adjustable settings to change position and other flue conditions.

In some variations, the flue may have components to increase, or decrease air resistance. Increased air resistance in the flue may function to diminish the updraft chimney effect. In some variations, the exhaust may include interfering flaps. In some implementations the interfering flaps may be engaged or disengaged, to only decrease air resistance when desired.

In some variations, the exhaust outlet may increase air resistance by including winding tubing/piping. Winding tubing may include twists and turns to increase air resistance. Winding tubing/piping may additionally enable wrapping tubing around components to provide insulation or heating. For example, in one implementation, exhaust piping may wrap around the reaction chamber 110 such that hot exhaust gas heats the reaction chamber. Additionally, or alternatively, to the winding tubing/piping, air resistance may be increased by narrowing the piping, or outlet. The flue gas outlet may be narrowed to a point of choked flow (e.g. the gas at the narrowest constriction achieves supersonic velocity).

In some variations, the exhaust may also have an “air curtain”. The air curtain may comprise of one or more air vents (configured to allow only air in) at a level above the hottest height in the reaction chamber 110. These air “inlets” may introduce additional air flow with a velocity less than, equal to, or greater than the velocity of the rising exhaust gas flow. The additional air may be introduced at an angle to the exhaust gas flow (for example perpendicularly). In some implementations, these air inlets may be preferentially placed above the biomass bed level, and inject air into the exhaust flow orthogonal to the vertical direction. Dependent on implementation, these air inlets may comprise one or more pairs of inlets located 180 degrees apart introducing opposing jets.

In some variations, the system may include a variable incline module 160. As shown in FIGS. 3 and 4, the variable incline module 160 functions to alter the height of bioreactor components, and/or position the bioreactor, or bioreactor components, at an incline. The variable incline module may comprise support components that enable the raising and lower of the bioreactor, and the bioreactor components. In one variation, the variable incline module 160 comprises a jack, or multiple jacks, positioned underneath the bioreactor to alter the angle of inclination of the outlet chamber 120. In another variation, the variable incline module 160 comprises a hydraulic mechanism (e.g., a hydraulic bed), positioned underneath and/or to the side of the bioreactor, to alter the angle of inclination of the outlet chamber 120. In third variation, the variable incline module 160 comprises a pulley system configured to raise or lower the bioreactor to alter the angle of inclination of the outlet chamber 120. In many variations, the variable incline module is configured to operate in conjunction with other system components, particularly the conveyor system 140 and the gas exchange system.

The variable incline module 160 may function in conjunction conveyor system to improve biomass densification. As shown in FIG. 3 or 4, in some variations, the variable incline module may increase the slope of the bioreactor in conjunction with movement of biomass along the conveyor system 140 by an auger. Increasing the slope of the bioreactor, particularly between the outlet chamber 120 and reaction chamber 110. The slope of the incline in conjunction with the velocity of the auger may then be used to set the level of biomass densification.

Figure 17:
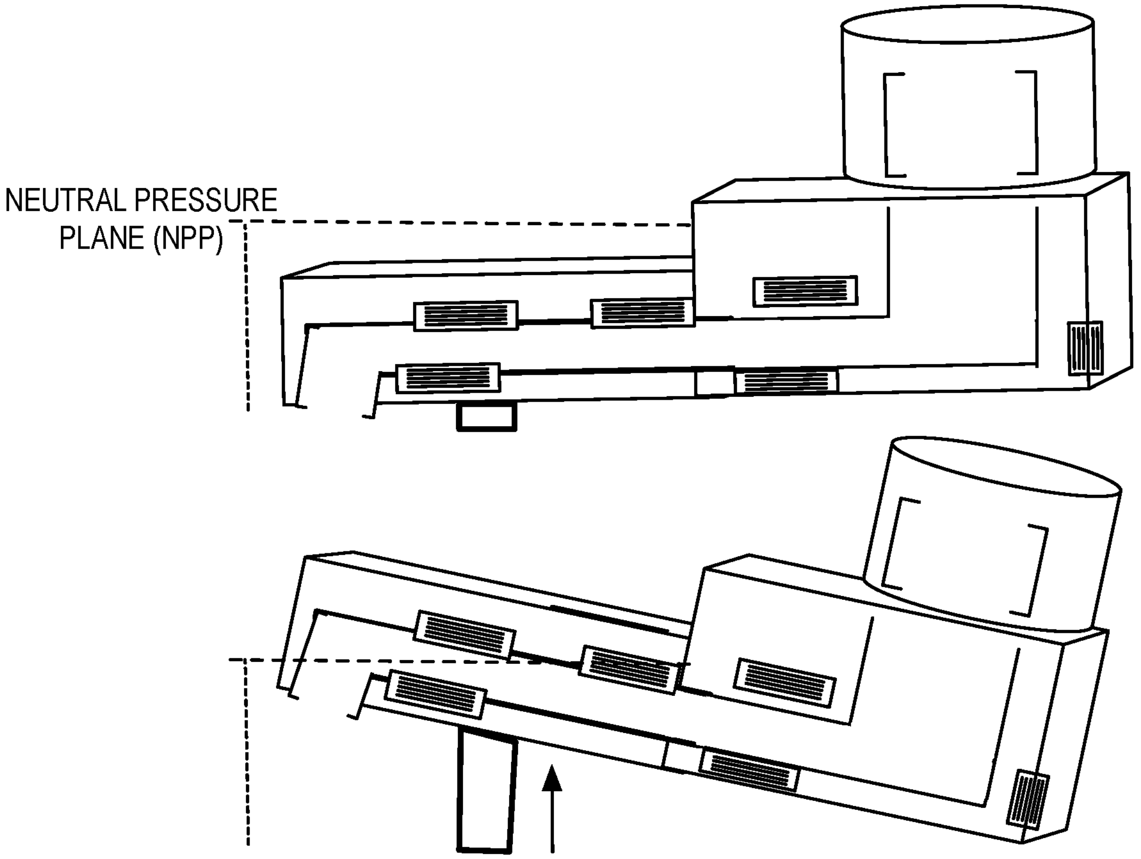
FIG. 17 is one example of system actuation with respect to the neutral pressure plane.
Figure 18:
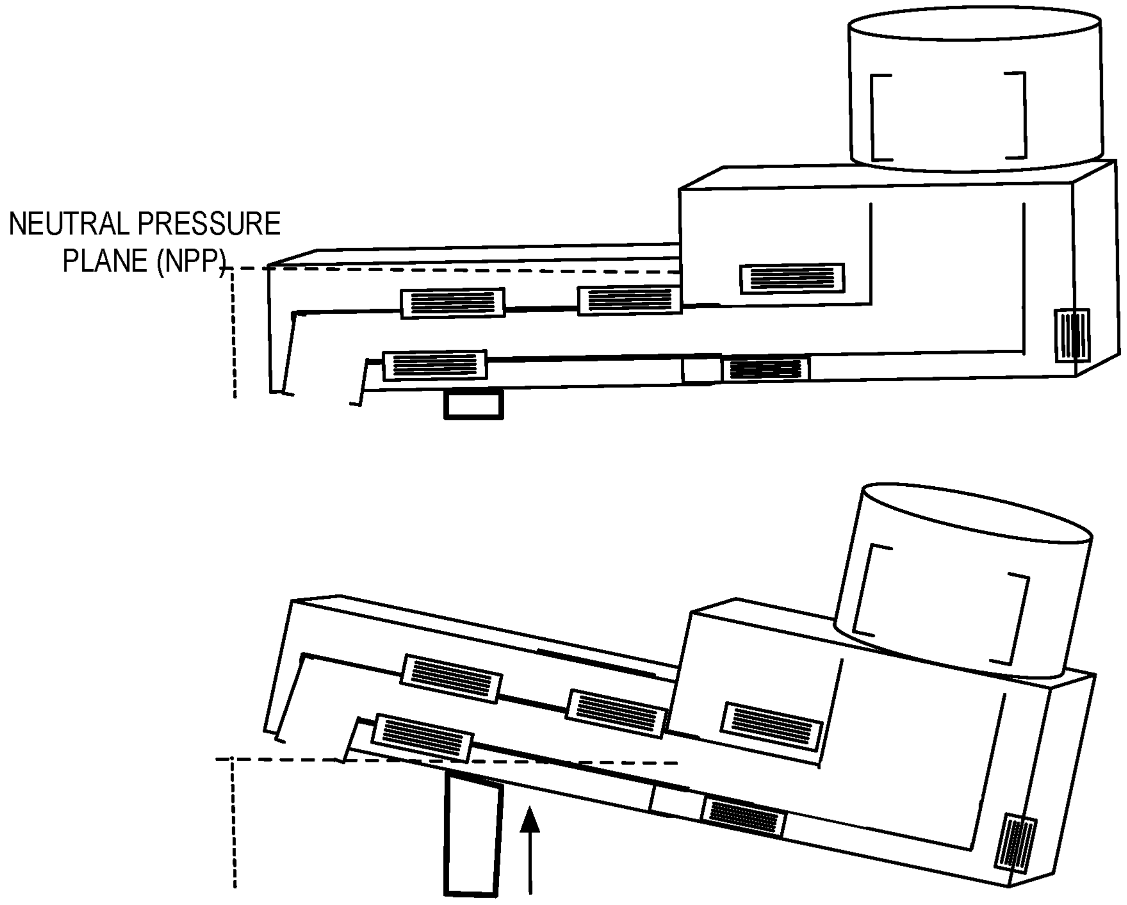
FIG. 18 is one example of system actuation with respect to the neutral pressure plane.

The variable incline module 160 may also function in conjunction with the gas exchange system 150 to regulate and or control air/gas flow. As shown in FIGS. 17 and 18, using the test ports (or temperature profile of the outlet chamber 120), the NPP may be adjusted with respected to the bioreactor such that desired air vents 152 may travel allow passive air flow in the desired direction. The variable incline module 160 may thus have operating modes, to set the incline to the desired type of function. For example, in one implementation the variable incline module 160 includes a first neutral pressure plane operation mode, such that in the first neutral pressure plane operation mode, the variable incline module actuating components dynamically alters the height of the outlet chamber 120 such that an air vent 152 on the outlet chamber is situated above the neutral pressure plane. In a second implementation, the variable incline module 160 includes a second neutral pressure plane operation mode, such that in the second neutral pressure plane operation mode, wherein the variable incline module actuating components dynamically alters the height of the outlet chamber 120 such that an air vent 152 on the outlet chamber is situated at approximately the same height as the neutral pressure plane. In a third implementation, the variable incline module 160 includes a third neutral pressure plane operation mode, wherein the variable incline module actuating components dynamically alters the height of the outlet chamber 120 such that an air vent 152 on the outlet chamber is below the neutral pressure plane.

In some variations, the system may additionally include a power system. The power system functions to provide energy for the process of biomass. In many variations, the power system provides an initial net energy to initiate an energetically favorable reaction. Alternatively, the power system may provide energy throughout the process. Additionally, the power system may provide energy for other aspects of the system and system components (e.g. provide energy for: heat generation for combustion, sensor operation, communication, and processors, and actuation of system components). The power system may be particularly useful for implementations in more remote regions wherein the system components have no "grid" energy access. The power system may specific and may comprise an energy repository (e.g. battery), generator, or both. The power system may also include or integrate with power sources such as a solar power source or other types of sources that can be used to supply more energy for storage. In variations that include just a battery power system, the battery preferably has sufficient energy to initiate bioreactor reaction. Once the bioreactor reaction has initiated, in some variations, the reactor may use the energy released by the reaction to recharge the battery. Examples power systems include: a thermoelectric generator, that uses the thermal gradient across the biomass reactor; heat/steam engine, that generates energy from the bioreactor exhaust; wind turbine; or a wave power generator, that generates energy from waves. Additionally, available energy stored in the power system may be monitored and used in in selecting a processing mode.

In some variations, the system may further include a sensor system. The sensor system functions as a real-time monitor of the biomass environment. The biomass environment may include the interior of the bioreactor and the biomass itself. The sensor system may additionally or alternatively provide sensor data regarding the exterior of the bioreactor, source location of the biomass, and any other desired sensor data.

The sensor system may include at least one sensor (i.e. sensor subcomponents). Sensor components function to acquire sensor data specific to the sensor. Generally speaking, the sensor system monitors the biomass. This monitoring preferably includes the time where the biomass is processed. The sensor system may provide information, both to the bioreactor to enable appropriate actions by the bioreactor to correctly process the biomass; and to other system components, to enable the appropriate actions in controlling system components. In some variations, the sensor system may also provide information to an external user as desired. Examples of possible sensors that a sensor may have include: camera sensors (e.g. digital film camera), temperature sensors (e.g. thermometer), pressure sensors (e.g. barometer), sample extractor (e.g. for chemical analysis), humidity sensor (e.g. hygrometer), composition sensors (e.g. ultrasound, spectrometer), and/or other suitable types of sensors. The type of sensor used is preferably dependent on the implementation, more preferably dependent on the specific bioreactor no and the types of biomass that the bioreactor can process.

In some variations, the system may include a control unit. The control unit may function to monitor, synchronize, operate, and coordinate system components. The control unit may comprise any Turing complete component (e.g., microprocessor) that is enabled to communicate and function with the system. In many variations, the control unit may enable complex processes by other system components by enacting operating modes for the system. The control unit may be directly connected to other system components, but may alternatively be at some other location. In some variations, the control unit 140 may be a processor on some network (e.g. on a network cloud). Additionally, the control unit may enable interaction with a human component, such that a person may implement specific system activities through the control unit.

In some variations, the control unit may enable external control of the system. This may be accomplished through a user interface (UI). Through the UI, a user may receive data (e.g. sensor system 120 data, general information online data, control unit data) from system components and send out commands to the system and/or system components, both prior to and during bioreactor activity. User control may include adding additional parameters, modifying control unit operations, adding new control unit operations (prioritizing low carbon emission end-products), and cancelling current operations. Standard control unit operations may include, inputting the type of biomass, setting an end-product, and setting air-gas current direction, setting a biomass/char end-product density/size (e.g., how small the biomass should be ground before, or after, processing).

Once the system has been activated, the control unit may further interact with the system component to enable desired processes. Examples of processes that the control unit may monitor and control include: biomass end-product processing, biomass densification, and setting air/gas current. These processes may additionally include sub-processes. Examples of sub-processes may include, setting sets of air vents on/off, setting sets of air vents to active/passive air flow, setting active air vent pressure, angling secondary air vents with respect to the system component incline, setting the flue length, setting the flue position, determining the neutral pressure plane (NPP), setting system component incline with respect to the NPP, setting conveyor system speed, setting system component incline with respect to biomass densification.

In some variations, the control unit may enable biomass densification. In one example, given a biomass type, and a desired end-product, the control unit may: determine biomass density (e.g. from the sensor system by monitoring the gas exchange between the reaction chamber 110 and the outlet chamber 120), set the conveyor system 140 to transport biomass at a desired rate, and activate the variable incline module 160 to raise the bioreactor, or just a bioreactor chamber (e.g., the outlet chamber 120), to an incline to optimize biomass compression.

In some variations, the control unit may enable setting the bioreactor air/gas current flow (e.g., setting the current to co-current, counter-current, or cross-current as compared to the direction of biomass transport. In one example, given a desired cross-current, or desired no passive current, the control unit may first determine the neutral pressure plane (NPP) by: activating the test port air vents along the walls of the outlet chamber 120 and/or the reactor, and monitoring the direction of air flow through the test ports. The control unit may then activate the variable incline module to raise the outlet chamber 120 such that the first air vent 152 is approximately at the height of the NPP. In a second example, given a desired co-current and given a desired biomass density and end-product, the control unit may first may enable the biomass densification, as described above, thereby setting the outlet chamber 120 at an incline. The control unit may then determine the NPP at the current system incline. Once the NPP has been determined, the control unit may then open passive air vents below the NPP to enable co-current air flow.

In some variations, the control unit may set the end-product, wherein the control unit may enact the appropriate operating modes to produce the end-product. The control unit may receive information from the sensor system and from external components (e.g. a user). The control unit may then leverage the information received (e.g., input biomass, biomass quantity, desired end-product, etc.) to activate the appropriate operating mode(s) to produce the end-product. In one example, given the input biomass (e.g., coconut shells), desired end-product (char), the control unit may activate the reaction chamber 110 to enact the appropriate operating mode (i.e., processes) to process the biomass into the end-product. Additionally, the control unit may extend or retract the flue and reposition the flue to match the incorporated processing. In variations, wherein an optimal biomass density or desired current is not given, the control unit may additionally determine an optimal biomass density and optimal air flow direction. These "optimal" values may be previously input values, extracted from external sources, and/or determined by the control unit through machine learning or implemented optimization processes.

Figure 19:
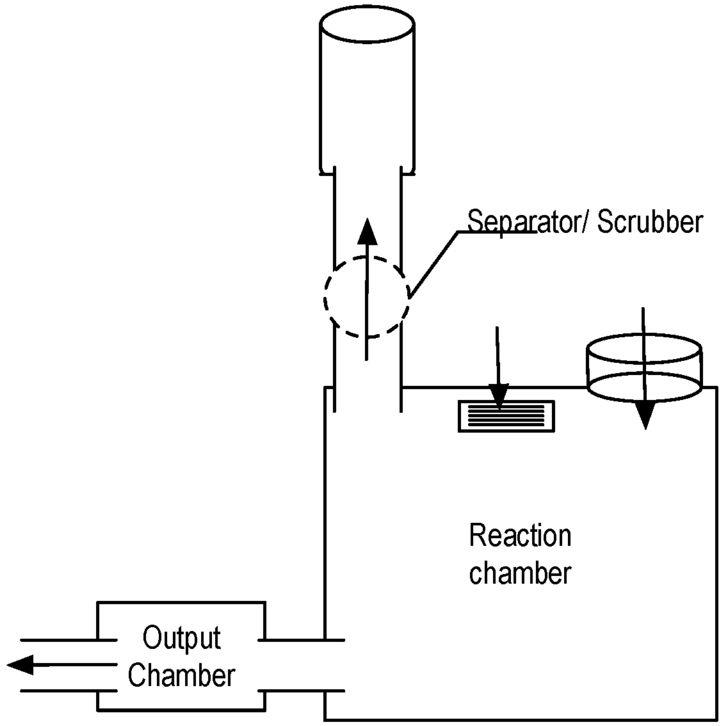
FIG. 19 is a schematic of an example system.
Figure 20:
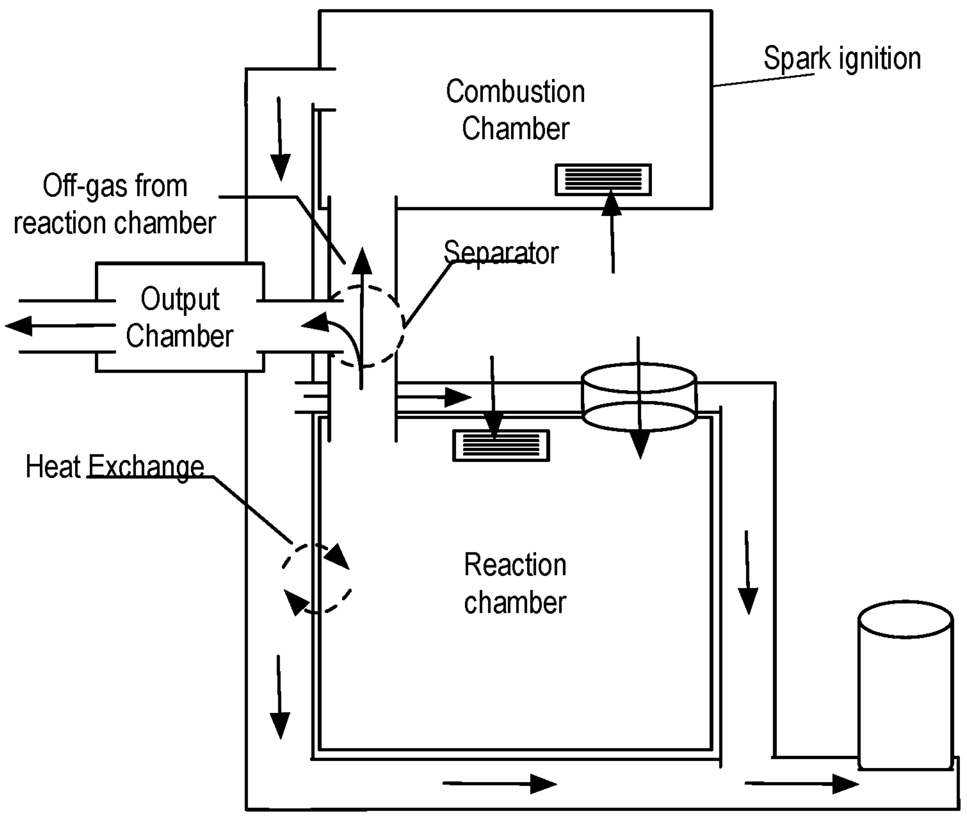
FIG. 20 is a schematic of an example system.

In some variations, the system may be particularly applicable for the production of a carbon fiber end-product. As part of a carbon fiber end-product the biomass reactor may incorporate inputs broader than just biomass. For example, in some variations, in addition to biomass, the biomass reactor may process plastics, PAN, and/or other carbon fiber precursors. As shown in FIGS. 19 and 20, in these variations, the system may further include a combustion chamber, or incorporate a combustion chamber within the reaction chamber no; and a separator/scrubber. This alternative variation may be used with the system described above or configured for use with any suitable type of reactor system.

The combustion chamber may function to enable high temperature combustion to initiate a carbonization reaction (e.g., around 1000 C). The combustion chamber may include a spark ignition. In some variations, off-gas from the reaction chamber 110 may flow through the combustion chamber and then circulate around the reaction chamber to heat the reaction chamber. The off-gas, within the combustion chamber, may be mixed with an oxygen-containing gas (e.g., air) to combust the mixture, generating heat that can be used to support the thermochemical process. This lowers the overall external energy required to provide heat to the thermochemical steps, and in some cases, may even make these steps auto-thermal, meaning that they will not require any external energy to sustain themselves on a continuous or batch basis.

Once the off-gas is combusted, the post-combustion hot flue gas can exchange heat with the thermochemical reaction chamber no. In one variation, the hot flue gas can exchange heat with the reaction chamber 110 through a wall (e.g., conduction), as shown in FIG. 20. This heat exchange may be incorporated in many different ways, as desired by implementation, for example: heat conducting shell, tube, pipe, evaporators, condensers, etc. In a second variation, the flue gas can exchange heat with the reaction chamber no directly with the reactants, as shown in FIG. 19 (e.g., reacting polyacrylonitrile fibers or other reaction intermediates such as graphitized substrates). In a third variation, the flue gas can exchange with the reaction chamber no through radiation.

As shown in FIG. 20, the off-gas may be directed into the combustion chamber where it is mixed air an oxygen-containing gas (such as air) and combusted. A spark ignition may be inserted into the chamber to ensure that the combustion is stable. One or more gas and temperature sensors (e.g. thermocouples or thermistors) may be inserted into, before, after, or on the interior or exterior surface of the combustion chamber to monitor the temperature of the gas mixture and the post-combustion flue gas. The post-combustion flue gas may then be passed through a channel that surrounds one or more of the thermochemical reaction chambers, either on the outside, on the inside, or both, separated by a wall (e.g., a thin metal wall such as stainless steel). The wall may then enable heat to pass into the thermochemical reaction chamber(s) to sustain the thermochemical reaction.

Alternatively, as shown in FIG. 19, the off-gas, as soon as it is released inside the thermochemical reaction chamber(s) 110, may be mixed with a certain amount of oxygen-containing air (for example at stoichiometric ratio) and combusted in the same reaction chamber. This generates the hot post-combustion flue gas which immediately exchanges heat with the reactants (such as the reacting polyacrylonitrile fibers) to support the thermochemical treatment step (e.g. oxidation/stabilization or the subsequent carbonization). In steps where an inert condition is required (such as the carbonization step). The reaction kinetics of the off-gas oxidation may be maintained sufficiently fast, such that the resultant post-combustion products will still be able to maintain a roughly inert environment.

For the radiation heat transfer, the same setup as described in "through a wall" heat exchange may be implemented, but the wall is heated to a sufficiently high temperature that it radiates into the thermochemical reaction chamber and passes heat into the reacting carbon-based substrate.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums storing instructions that, when executed by the one or more computer processors, cause a computing platform to perform operations comprising those of the system or method described herein such as: processing the biomass; densifying the biomass; and setting the air/gas current.

Similarly, in another variation, a non-transitory computer-readable medium storing instructions that, when executed by one or more computer processors of a computing platform, cause the computing platform to perform operations of the system or method described herein such as: processing the biomass; densifying the biomass; and setting the air/gas current.

Figure 21:
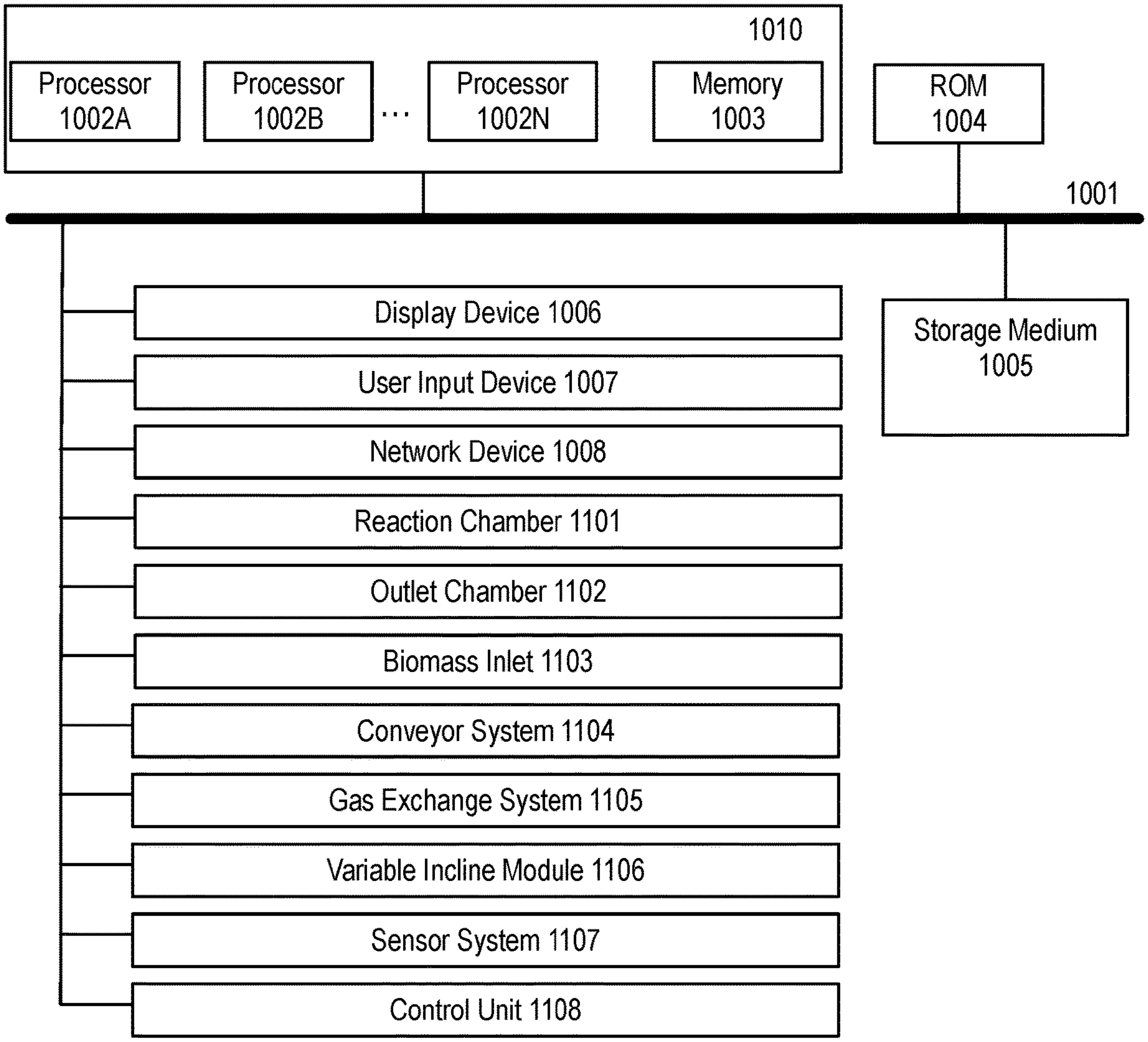
FIG. 21 is an exemplary system architecture that may be used in the system and/or method.

FIG. 21 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting the reaction chamber 1101, the outlet chamber 1102, the biomass inlet 1103, the conveyor system 1104, the gas exchange system 1105, the variable incline module 1106, the sensor system 1107, the control unit 1108, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

The invention claimed is:

1. A system for a multi-chamber biomass reactor comprising:
- a reaction chamber configured to enable thermal decomposition of biomass within the reaction chamber;
- an outlet chamber, adjacent and connected to the reaction chamber;
- a biomass inlet, comprising a region for the input of biomass into the biomass reactor;
- a conveyor system, comprising components that actuate the biomass through the biomass reactor, from the biomass inlet through the reaction chamber and through the outlet chamber; and
- a gas exchange system, that controls gas flow within the biomass reactor, comprising:
  - at least one air vent, comprising a first air vent positioned on the outlet chamber, and
  - an exhaust comprising air inlets configured to inject air in a direction orthogonal to gas flow within the exhaust.

2. The system of claim 1, wherein the conveyor system comprises a mechanism with non-uniform actuation of the biomass along a defined path of actuation enabling compression of the biomass in proximity to the region where the reaction chamber and the outlet chamber are connected.

3. The system of claim 2, wherein the conveyor system sufficiently compresses the biomass such that the biomass restricts air flow between the reaction chamber and the outlet chamber.

4. The system of claim 3, wherein the conveyor system comprises a variable pitch auger.

5. The system of claim 1, wherein the exhaust comprises a flue, enabling gas flow out of the biomass reactor.

6. The system of claim 5, wherein the length of the flue is approximately 2-6.5 times the height of the outlet chamber.

7. The system of claim 5, wherein the flue comprises an extendable element such that the flue length may vary.

8. The system of claim 5, wherein the flue is positioned on the outlet chamber in proximity to the side of the outlet chamber adjacent to the reaction chamber.

9. The system of claim 5, wherein the flue is positioned on the outlet chamber in proximity to the side of the outlet chamber furthest away from the reaction chamber.

10. The system of claim 5, wherein the flue comprises an actuatable component such that the flue position may be changed along the direction of biomass conveyance.

11. The system of claim 1, wherein the at least one air vent comprises a second air vent positioned on the reaction chamber.

12. The system of claim 11 wherein the second air vent is angled as compared to the incline of the reaction chamber.

13. The system of claim 1, wherein the outlet chamber is positioned at an incline such that the first air vent is raised above a neutral pressure plane, thereby enabling gas flow out of the outlet chamber via the first air vent.

14. The system of claim 1, wherein the outlet chamber is positioned at an incline such that the first air vent is in proximity of the neutral pressure plane, thereby negating gas flow in or out of the outlet chamber via the first air vent.

15. The system of claim 1, wherein the outlet chamber is positioned at an incline such that the first air vent is below the neutral pressure plane, thereby enabling gas flow into the outlet chamber via the first air vent.

16. The system of claim 1, wherein the at least one air vent comprises a plurality of air vents situated at distinct heights along the outlet chamber, enabling detection of a neutral pressure plane.

17. The system of claim 16, further comprising a variable incline module, wherein the variable incline module comprises actuating components that alter the height of the outlet chamber as compared to an initial placement of the bioreactor.

18. The system of claim 17, wherein the variable incline module includes a first neutral pressure plane operation mode, such that in the first neutral pressure plane operation mode, the variable incline module actuating components are configured to dynamically alters the height of the outlet chamber such that an air vent on the outlet chamber is situated above the neutral pressure plane.

19. The system of claim 18, wherein the variable incline module includes a second neutral pressure plane operation mode, such that in the second neutral pressure plane operation mode, the variable incline module actuating components are configured to dynamically alters the height of the outlet chamber such that an air vent on the outlet chamber is situated at approximately the same height as the neutral pressure plane.

20. The system of claim 19, wherein the variable incline module includes a third neutral pressure plane operation mode, such that in the third neutral pressure plane operation mode, the variable incline module actuating components are configured to dynamically alters the height of the outlet chamber such that an air vent on the outlet chamber is below the neutral pressure plane.

* * * * *